United States Patent
Shei et al.

(10) Patent No.: US 7,446,282 B2
(45) Date of Patent: Nov. 4, 2008

(54) FOOD SERVICE APPARATUS AND METHODS

(75) Inventors: Steven M. Shei, Fort Wayne, IN (US); Timo Henk, Collinsville, IL (US)

(73) Assignee: Duke Manufacturing Co., St. Louis, MO (US)

( * ) Notice: Subject to any disclaimer, the term of this patent is extended or adjusted under 35 U.S.C. 154(b) by 0 days.

(21) Appl. No.: 11/459,752

(22) Filed: Jul. 25, 2006

(65) Prior Publication Data
US 2008/0023462 A1 Jan. 31, 2008

(51) Int. Cl.
*A21B 1/22* (2006.01)
*A23B 4/03* (2006.01)
(52) U.S. Cl. ................. 219/391; 219/400; 219/411; 219/412; 219/414; 219/492; 99/476; 99/478; 99/483
(58) Field of Classification Search ............... 219/391, 219/400, 411–12, 414, 492–3; 99/474, 476, 99/478, 483
See application file for complete search history.

(56) References Cited

U.S. PATENT DOCUMENTS

| | | | |
|---|---|---|---|
| 3,313,917 A | 4/1967 | Ditzler | |
| 3,601,582 A | 8/1971 | Boisfleury | |
| 3,751,629 A | 8/1973 | Eisler | |
| 4,110,587 A | 8/1978 | Souder, Jr. | |
| 4,337,384 A | 6/1982 | Tanaka | |
| 4,381,442 A | 4/1983 | Guibert | |
| 4,972,824 A | 11/1990 | Luebke | |
| 5,724,886 A | 3/1998 | Ewald | |
| 5,945,018 A | 8/1999 | Halen | |
| 6,011,243 A | 1/2000 | Arnold | |
| 6,119,587 A | 9/2000 | Ewald | |
| 6,209,447 B1 | 4/2001 | Ewald | |
| 6,541,739 B2 | 4/2003 | Shei | |
| 6,658,994 B1 | 12/2003 | McMillan | |
| 6,710,308 B2 | 3/2004 | Sauter | |
| 6,841,760 B2 * | 1/2005 | Whipple, Jr. | 219/395 |
| 7,081,601 B2 * | 7/2006 | Boyer et al. | 219/482 |
| 2003/0047553 A1 | 3/2003 | Patti | |
| 2004/0020915 A1 | 2/2004 | Shei | |
| 2004/0069155 A1 | 4/2004 | Shei | |

FOREIGN PATENT DOCUMENTS

GB 829729 3/1960

OTHER PUBLICATIONS

International Search Report for PCT/US03/20857, Mar. 22, 2005, 3 pages.

* cited by examiner

*Primary Examiner*—Shawntina Fuqua
(74) *Attorney, Agent, or Firm*—Senniger Powers LLP

(57) ABSTRACT

In general, this invention involves various improvements relating to food service apparatus, including an energy-compensation feature to compensate for the transfer of heat from one food-holding compartment to another food-holding compartment, and an energy-limit feature for preventing overheating of the apparatus in the event it is incorrectly programmed by an operator, for example.

25 Claims, 27 Drawing Sheets

FIG. 29A

| PERIOD | 1 | 2 | 3 | 4 | 5 | 6 | 7 | 8 | 9 | 10 | 11 |
|---|---|---|---|---|---|---|---|---|---|---|---|
| DESIRED DUTY CYCLE | 90% | 90% | 90% | 90% | 90% | 90% | 90% | 90% | 90% | 90% | 90% |
| ACTUAL DUTY CYCLE | 90% | 90% | 90% | 90% | 90% | 90% | 90% | 90% | 90% | 90% | 90% |
| % PT CHANGE | 0% | 0% | 0% | 0% | 0% | 0% | 0% | 0% | 0% | 0% | 0% |
| ENERGY UNITS EARNED/MIN | 4.5 | 4.5 | 4.5 | 4.5 | 4.5 | 4.5 | 4.5 | 4.5 | 4.5 | 4.5 | 4.5 |
| 30 MIN TOTAL | 4.5 | 9 | 13.5 | 18 | 22.5 | 27 | 31.5 | 36 | 40.5 | 45 | 49.5 |

FIG. 29B

| PERIOD | 12 | 13 | 14 | 15 | 16 | 17 | 18 | 19 | 20 | 21 | 22 |
|---|---|---|---|---|---|---|---|---|---|---|---|
| DESIRED DUTY CYCLE | 90% | 90% | 90% | 90% | 90% | 90% | 90% | 90% | 90% | 90% | 90% |
| ACTUAL DUTY CYCLE | 90% | 30% | 30% | 30% | 30% | 30% | 30% | 30% | 30% | 30% | 30% |
| % PT CHANGE | 0% | 60% | 60% | 60% | 60% | 60% | 60% | 60% | 60% | 60% | 60% |
| ENERGY UNITS EARNED/MIN | 4.5 | 0 | 0 | 0 | 0 | 0 | 0 | 0 | 0 | 0 | 0 |
| 30 MIN TOTAL | 54 | 54 | 54 | 54 | 54 | 54 | 54 | 54 | 54 | 54 | 54 |

FIG. 29C

| PERIOD | 23 | 24 | 25 | 26 | 27 | 28 | 29 | 30 | 31 | 32 | 33 |
|---|---|---|---|---|---|---|---|---|---|---|---|
| DESIRED DUTY CYCLE | 90% | 90% | 90% | 90% | 90% | 90% | 90% | 90% | 90% | 90% | 90% |
| ACTUAL DUTY CYCLE | 30% | 30% | 30% | 30% | 30% | 30% | 30% | 30% | 30% | 90% | 90% |
| % PT CHANGE | 60% | 60% | 60% | 60% | 60% | 60% | 60% | 60% | 60% | 0% | 0% |
| ENERGY UNITS EARNED/MIN | 0 | 0 | 0 | 0 | 0 | 0 | 0 | 0 | 0 | 4.5 | 4.5 |
| 30 MIN TOTAL | 54 | 54 | 54 | 54 | 54 | 54 | 54 | 54 | 49.5 | 49.5 | 49.5 |

FIG. 29D

| PERIOD | 34 | 35 | 36 | 37 | 38 | 39 | 40 | 41 | 42 | 43 | 44 |
|---|---|---|---|---|---|---|---|---|---|---|---|
| DESIRED DUTY CYCLE | 90% | 90% | 90% | 90% | 90% | 90% | 90% | 90% | 90% | 90% | 90% |
| ACTUAL DUTY CYCLE | 90% | 90% | 90% | 90% | 90% | 90% | 90% | 90% | 90% | 90% | 30% |
| % PT CHANGE | 0% | 0% | 0% | 0% | 0% | 0% | 0% | 0% | 0% | 0% | 60% |
| ENERGY UNITS EARNED/MIN | 4.5 | 4.5 | 4.5 | 4.5 | 4.5 | 4.5 | 4.5 | 4.5 | 4.5 | 4.5 | 4.5 |
| 30 MIN TOTAL | 49.5 | 49.5 | 49.5 | 49.5 | 49.5 | 49.5 | 49.5 | 49.5 | 49.5 | 54 | 54 |

FIG. 29E

| PERIOD | 45 | 46 | 47 | 48 | 49 | 50 | 51 | 52 | 53 | 54 | 55 |
|---|---|---|---|---|---|---|---|---|---|---|---|
| DESIRED DUTY CYCLE | 90% | 90% | 90% | 90% | 90% | 90% | 90% | 90% | 90% | 90% | 90% |
| ACTUAL DUTY CYCLE | 30% | 30% | 30% | 30% | 30% | 30% | 30% | 30% | 30% | 30% | 30% |
| % PT CHANGE | 60% | 60% | 60% | 60% | 60% | 60% | 60% | 60% | 60% | 60% | 60% |
| ENERGY UNITS EARNED/MIN | 0 | 0 | 0 | 0 | 0 | 0 | 0 | 0 | 0 | 0 | 0 |
| 30 MIN TOTAL | 54 | 54 | 54 | 54 | 54 | 54 | 54 | 54 | 54 | 54 | 54 |

FIG. 29F

| PERIOD | 56 | 57 | 58 | 59 | 60 | 61 | 62 | 63 | 64 | 65 | 66 |
|---|---|---|---|---|---|---|---|---|---|---|---|
| DESIRED DUTY CYCLE | 90% | 90% | 90% | 90% | 90% | 90% | 90% | 90% | 90% | 90% | 90% |
| ACTUAL DUTY CYCLE | 30% | 30% | 30% | 30% | 30% | 30% | 30% | 90% | 90% | 90% | 90% |
| % PT CHANGE | 60% | 60% | 60% | 60% | 60% | 60% | 0% | 0% | 0% | 0% | 0% |
| ENERGY UNITS EARNED/MIN | 0 | 0 | 0 | 0 | 0 | 0 | 4.5 | 4.5 | 4.5 | 4.5 | 4.5 |
| 30 MIN TOTAL | 54 | 54 | 54 | 54 | 54 | 54 | 49.5 | 49.5 | 49.5 | 49.5 | 49.5 |

FIG. 29G

| PERIOD | 67 | 68 | 69 | 70 | 71 | 72 | 73 | 74 | 75 | 76 | 77 |
|---|---|---|---|---|---|---|---|---|---|---|---|
| DESIRED DUTY CYCLE | 90% | 90% | 90% | 90% | 90% | 90% | 90% | 90% | 90% | 90% | 90% |
| ACTUAL DUTY CYCLE | 90% | 90% | 90% | 90% | 90% | 90% | 90% | 90% | 30% | 30% | 30% |
| % PT CHANGE | 0% | 0% | 0% | 0% | 0% | 0% | 0% | 0% | 60% | 60% | 60% |
| ENERGY UNITS EARNED/MIN | 4.5 | 4.5 | 4.5 | 4.5 | 4.5 | 4.5 | 4.5 | 4.5 | 0 | 0 | 0 |
| 30 MIN TOTAL | 49.5 | 49.5 | 49.5 | 49.5 | 49.5 | 49.5 | 49.5 | 54 | 54 | 54 | 54 |

FIG. 29H

| PERIOD | 78 | 79 | 80 | 81 | 82 | 83 | 85 | 86 | 87 | 88 | 89 | 90 |
|---|---|---|---|---|---|---|---|---|---|---|---|---|
| DESIRED DUTY CYCLE | 90% | 90% | 90% | 90% | 90% | 90% | 90% | 90% | 90% | 90% | 90% | 90% |
| ACTUAL DUTY CYCLE | 30% | 30% | 30% | 30% | 30% | 30% | 30% | 30% | 30% | 30% | 30% | 30% |
| % PT CHANGE | 60% | 60% | 60% | 60% | 60% | 60% | 60% | 60% | 60% | 60% | 60% | 60% |
| ENERGY UNITS EARNED/MIN | 0 | 0 | 0 | 0 | 0 | 0 | 0 | 0 | 0 | 0 | 0 | 0 |
| 30 MIN TOTAL | 54 | 54 | 54 | 54 | 54 | 54 | 54 | 54 | 54 | 54 | 54 | 54 |

FOOD SERVICE APPARATUS AND METHODS

BACKGROUND OF THE INVENTION

This invention relates generally to food service equipment and more particularly to equipment for maintaining foods at temperatures suitable for serving food.

In one embodiment, this invention is especially (but not exclusively) directed to food service equipment that uses infrared (IR) heaters to maintain pre-cooked food at proper temperatures before serving. This type of equipment is referred to using such terms as holding oven, holding unit, and food warmer, and these terms are used interchangeably hereinafter. Such equipment is often used in, for example, the fast food service industry to heat food. However, such equipment has certain disadvantages. For example, short holding times (e.g., twenty minutes or less) and rapid product quality degradation often limit the effectiveness of this technology for holding applications. Additionally, different food products require different amounts of IR energy to be held in optimum condition. The quality of the food being held is affected in large part by the temperature and the air flow in the holding oven. As the food loses moisture due to evaporation, flavor is lost. This affects the texture and taste of the product. For example, chicken meat fibers will dry out and become tough, while the breading will become dry and greasy. French fries will develop a dry, rubbery texture as moisture is lost and the outer skin loses its crispness.

Conventional IR holding devices are not adjustable to control the amount of IR energy delivered to the food being heated. Rather, the heat source is on full power all of the time, and the food is placed relatively far from the heat source to prevent overheating. As a result, the typical prior holding device requires a large amount of vertical space. This can present a problem in a situation where space is at a premium, as in a fast-food restaurant.

U.S. Pat. Nos. 6,175,099, 6,262,394 and 6,541,739, assigned to Duke Manufacturing Co. of St. Louis, Mo. and incorporated herein by reference, are directed to a holding or cooking oven which is an improvement over prior designs and which has proven to be successful with various fried products. Relevant technology is also disclosed in pending U.S. application Ser. No. 10/680,626, filed Oct. 7, 2003, and in pending U.S. application Ser. No. 10/611,295, filed Jul. 1, 2003, which applications are also assigned to Duke Manufacturing Co. Each of the above-referenced patents and pending applications are incorporated herein by reference for all purposes not inconsistent with this disclosure.

Some food holding units (e.g., units for heating and/or cooling food) have multiple compartments each of which is adapted for holding a quantity of food. In such units, it is possible that heat transfer between adjacent compartments can have an adverse affect on food quality. There is a need, therefore, to compensate for such heat transfer. Further, where food is heated to higher temperatures, there is a need to prevent overheating of the food, any food-holding trays, and components of the unit.

SUMMARY OF THE INVENTION

Among the several objects of this invention will be noted the provision of improved food service equipment and methods of operation having one or more of the following advantages: the provision of holding pre-cooked food longer without degradation of the quality of the product, including products having a crust which tends to become soggy or rubbery, such as fried potato products, fried chicken, and rotisserie chicken; a method of maintaining previously cooked food in an environment where the quality of the food is maintained at a high level for a longer period of time; the provision of an energy-compensation feature which compensates for the transfer of heat from one food-holding compartment to another to prevent overheating of the food; and the provision of an energy-limit feature which limits the amount of energy (heat output) to the food in one or more holding compartments to prevent overheating of the food, food containers, or other components of the equipment.

In one embodiment, the present invention is directed to apparatus for heating food. The apparatus comprises a first compartment into which food is adapted to be placed, a first heat source in the first compartment for delivering heat to food in the first compartment, and a second compartment adjacent the first compartment into which food is adapted to be placed. The apparatus also includes a second heat source in the second compartment for delivering heat to food in the second compartment. A control system is provided for varying the amount of heat delivered by the first heat source as a function of the amount of heat delivered by the second heat source.

Similarly, in one embodiment, a method of operating apparatus of this invention comprises placing food in a first compartment of the apparatus, operating a first heat source of the apparatus to deliver heat to food in the first compartment, placing food in a second compartment of the apparatus adjacent the first compartment, and operating a second heat source of the apparatus to deliver heat to food in the second compartment. The method further comprises varying the amount of heat delivered by the first heat source as a function of the amount of heat delivered by the second heat source.

In another embodiment the present invention is directed to heating or cooling apparatus comprising a first compartment, a first heat transfer device operable in time-based cycles for heating or cooling the first compartment, a second compartment adjacent the first compartment, and a second heat transfer device operable in time-based cycles for heating or cooling the second compartment. The apparatus further comprises a control system for varying the amount of heat transferred by the first heat transfer device as a function of the amount of heat transferred by the second heat transfer device.

A related embodiment involves a method of operating apparatus for heating or cooling. The method comprises the steps of operating a first heat transfer device in time-based cycles to heat or cool a first compartment of the apparatus, and operating a second heat transfer device in time-based cycles to heat or cool a second compartment of the apparatus. The amount of heat transferred by the first heat transfer device is varied as a function of the amount of heat transferred by the second heat transfer device.

In another aspect, apparatus of this invention for heating food comprises at least one compartment into which food is adapted to be placed, a heat source for delivering heat to the food in the compartment, and a control system for operating the heat source in successive time-based cycles over a duration of holding time to heat food in the compartment according to a predetermined program. The control system comprises an algorithm adapted to override the aforesaid predetermined program and to reduce the heat output of the heat source in the event the amount of energy delivered by the heat source during a preceding segment of the duration of holding time reaches or exceeds a predetermined energy limit.

A related method involves the steps of placing food into a compartment of the apparatus of the preceding paragraph, and operating at least one heat source of the apparatus in successive time-based cycles over a holding period according to a predetermined program to deliver heat to the food in the compartment. The method further comprises overriding the aforesaid predetermined program and reducing the heat output of the heat source in the event the amount of energy delivered by the heat source during a preceding segment of said duration of holding time reaches or exceeds a predetermined energy limit.

Other objects and features will be in part apparent and in part pointed out hereinafter.

BRIEF DESCRIPTION OF THE DRAWINGS

FIGS. 29A-29H is a chart illustrating one embodiment of an energy-limit feature of this invention.

Corresponding parts are designated by corresponding reference numbers throughout the drawings.

DETAILED DESCRIPTION OF THE PREFERRED EMBODIMENT

Figure 1:
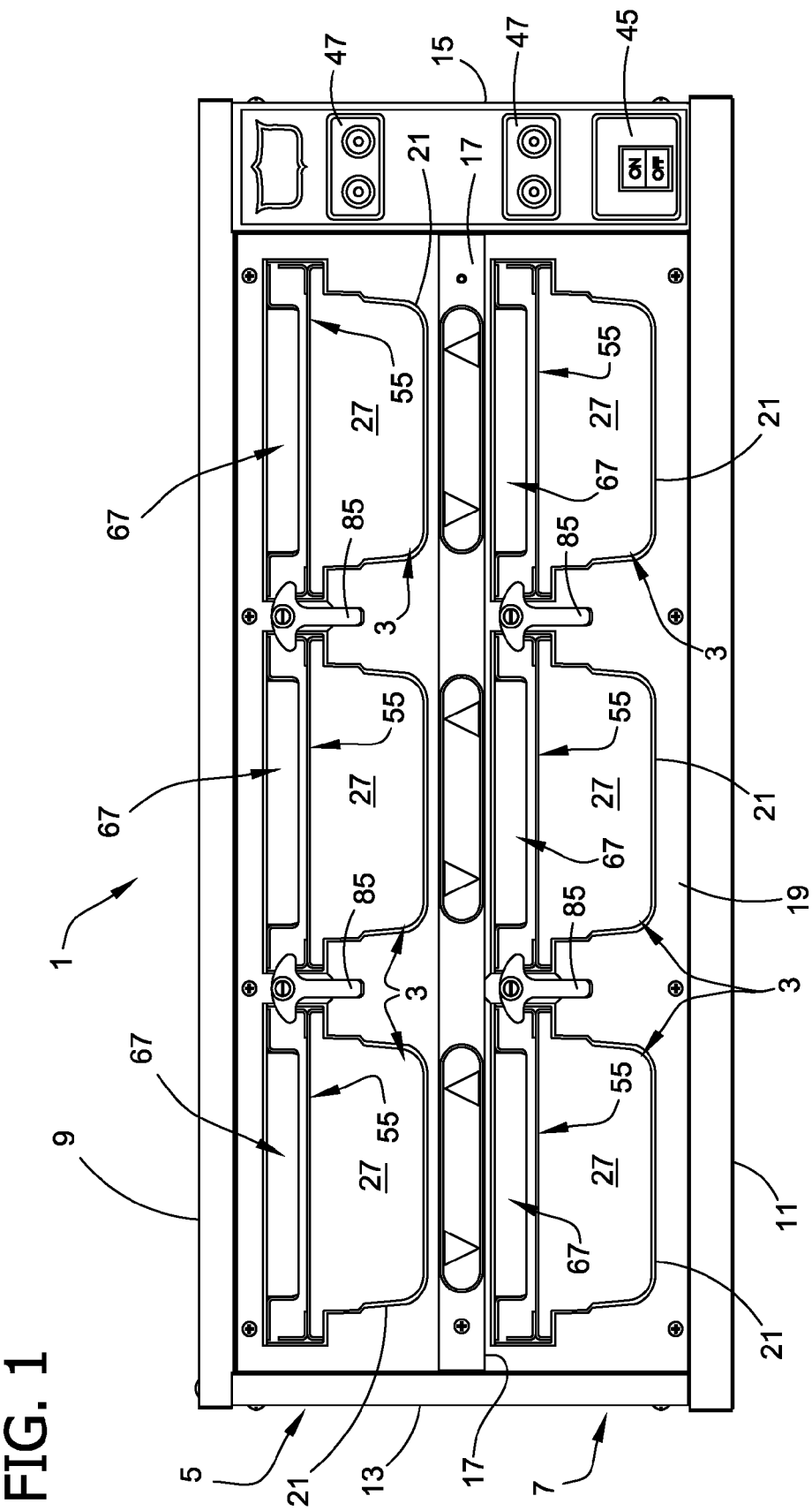
FIG. 1 is a front elevation of an oven of the present invention equipped with heat sinks for receiving food-containing trays, auxiliary heat sources mounted above the heat sinks, and metallic covers for covering the trays (the trays being omitted from the view)

FIG. 1 illustrates one embodiment of a holding oven of the present invention, generally designated 1, comprising a cabinet having an interior 12 comprising a plurality of tiers for removably receiving a plurality of trays, each generally designated 3, the trays in each tier being disposed side-by-side. As shown, the oven has two tiers, an upper tier 5 and a lower tier 7, each accommodating three trays. It is to be understood that the number of tiers and the number of trays in each tier may vary.

The holding oven 1 has a top 9, bottom 11, sides 13 and 15, and a shelf 17 extending from one side to the other generally midway of the top and bottom. The shelf 17 and top 9 define the upper tier 5; the bottom 11 and shelf 17 define the lower tier 7. The oven has a front panel 19 and a corresponding rear panel (not shown) each having openings such as indicated at 21 for sliding each tray 3 either into or out of its respective tier front or rear.

Figure 2:
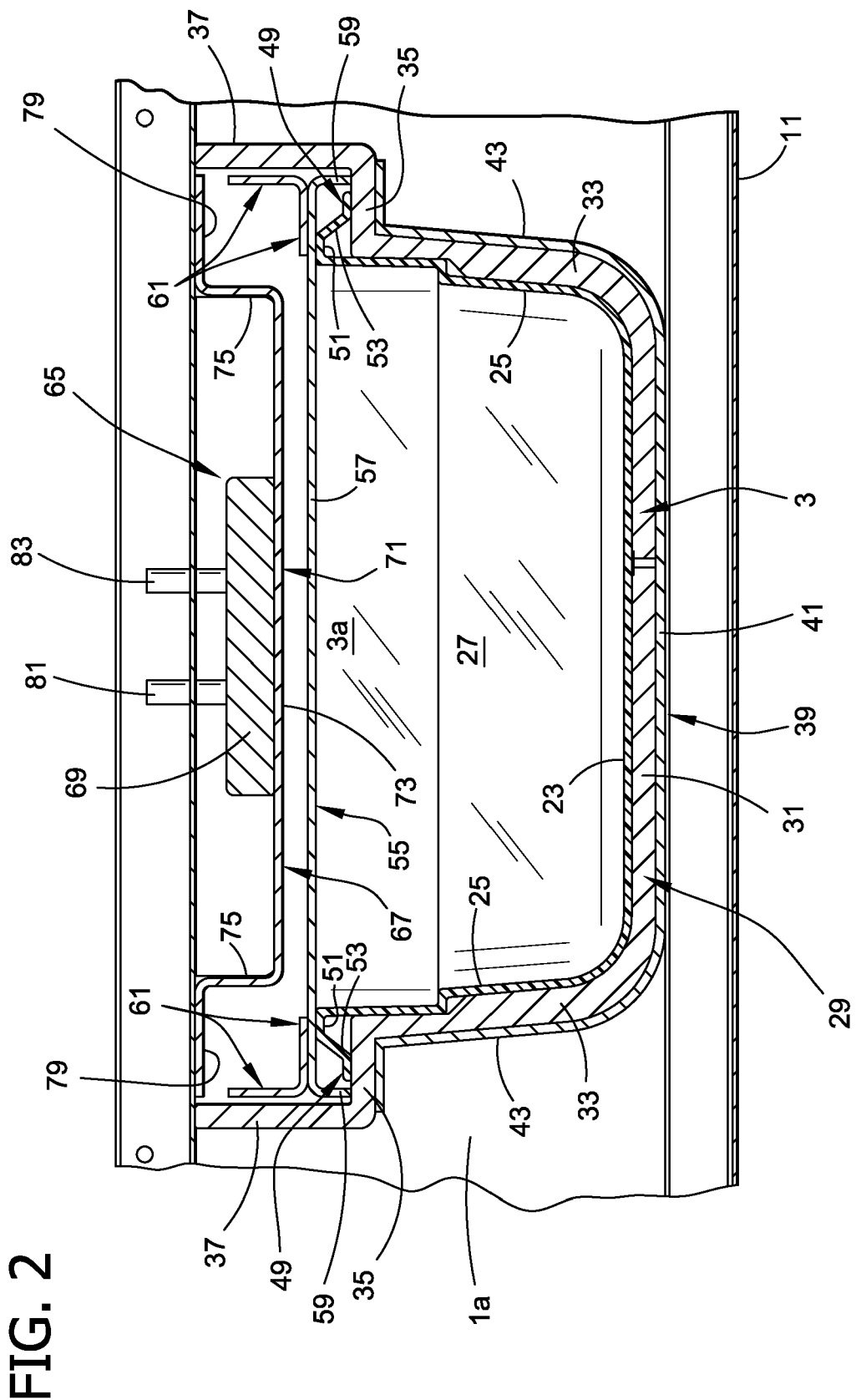
FIG. 2 is an enlarged sectional view of a portion of FIG. 1 but showing a tray positioned in a respective heat sink below its cover.
Figure 3:
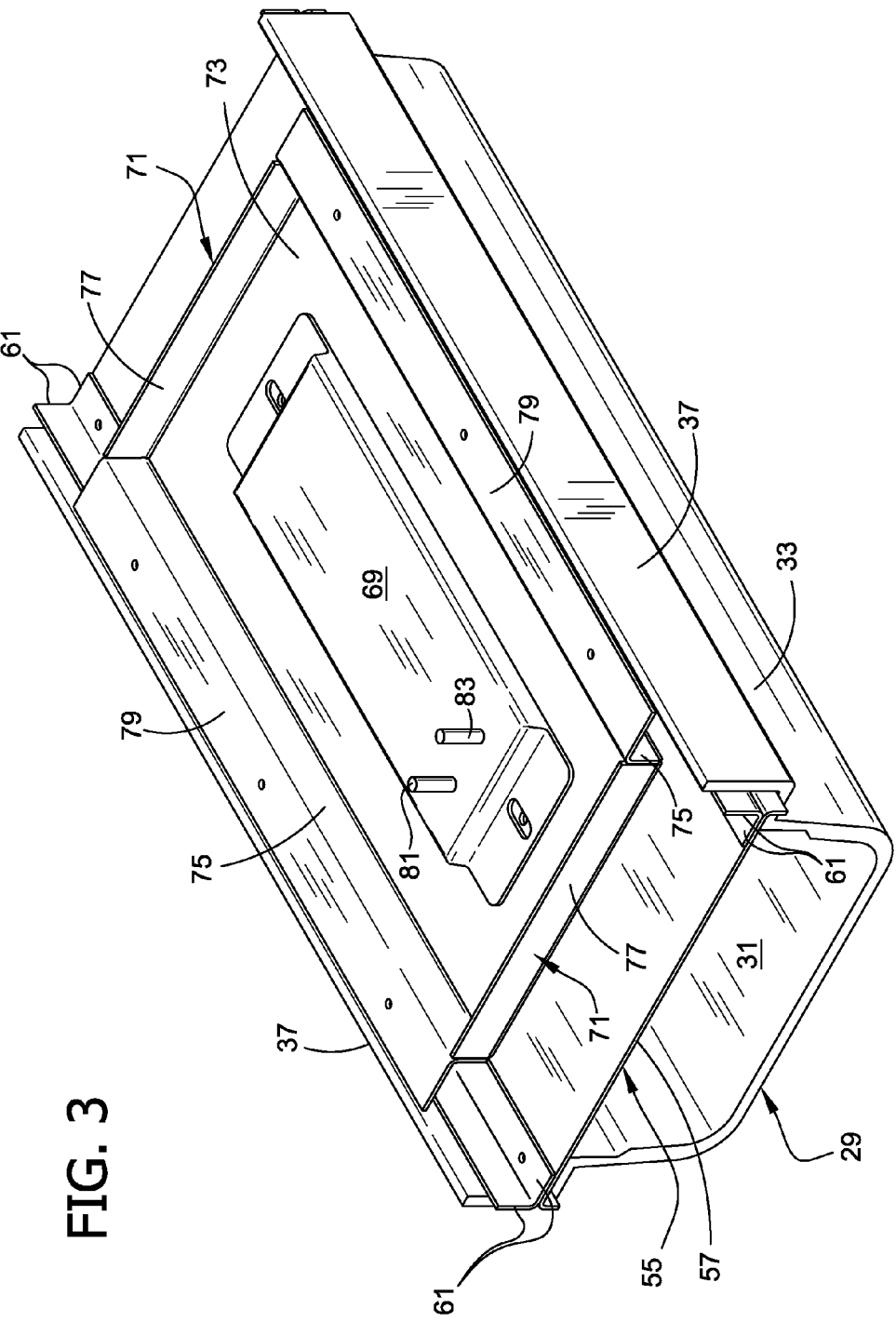
FIG. 3 is a perspective showing a heat sink, cover and auxiliary heat source.

In one embodiment, each tray 3 is generally rectangular in plan, having a bottom 23, opposite side walls each designated 25, and end walls each designated 27. Each tray is disposed in its respective tier 5, 7 in the oven 1 in a heat sink generally designated 29 extending from front to rear in the respective tier, being slidably disposed in its heat sink for being slidably withdrawn from or entered in the heat sink either front or rear through the respective opening 21. Each heat sink 29, which is made of aluminum, for example, has a bottom 31 and side walls each designated 33 (FIG. 2). The side walls 33 have outwardly (laterally) extending flanges 35 and rims 37 extending up from the outer margins of the flanges. Each heat sink constitutes a tray-receiving member for holding a single tray. An electrical resistance heating element generally designated 39 having a bottom component 41 contacting the bottom of the heat sink and upwardly extending side components 43 contacting the sides of each heat sink is provided for heating the heat sink and the tray 3 therein. Each heat sink 29 and associated heating element 39 constitutes the primary heating source for heating the respective tray 3 and its food content. At 45 is indicated an on-off electrical power control for all the heating elements 34. At 47, are indicated temperature controls for the heating elements 39 in the upper and lower tiers. The bottom component 41 of each heating element 39 in the upper tier 5 seats on shelf 17, the bottom component 41 of each heating element 39 in the lower tier 7 seats on the bottom 11 of the holding holding oven 1. The sides 43 of each heating element extend up to the flanges 35 of the respective heat sink 29. Reference may be made to U.S.

Pat. Nos. 6,175,099, 6,262,394 and 6,541,739, incorporated herein by reference, assigned to Duke Manufacturing Co. of St. Louis, Mo., for further details relating to the construction of the heat sink 29 and associated equipment.

Primary heating sources other than the heat sinks 29 and associated heating elements 39 can be used without departing from the scope of this invention.

Figure 4:
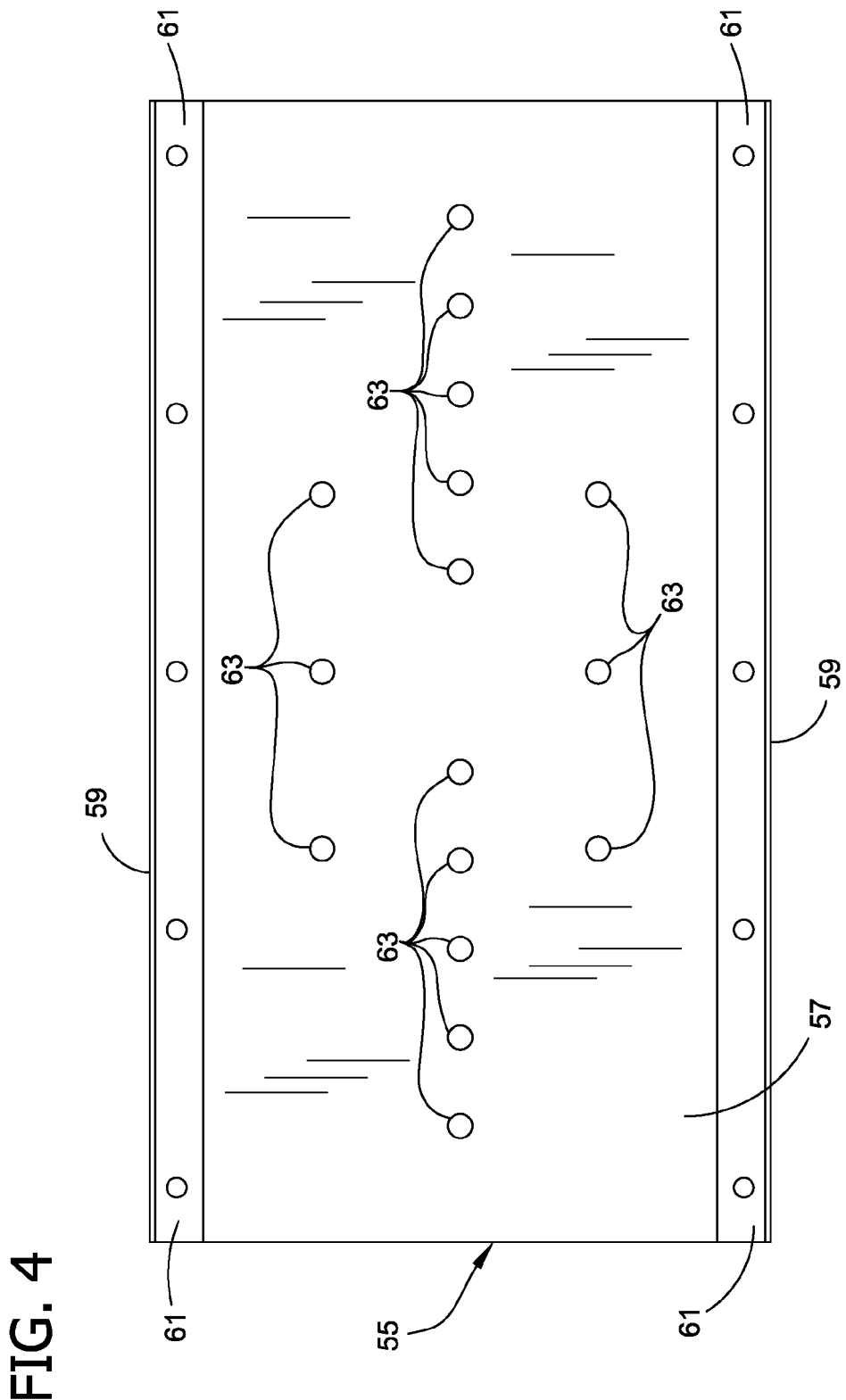
FIG. 4 is a plan of a cover per se.

In the preferred embodiment, each tray 3 has a rim 49 having an outwardly (laterally) directed upper part 51 with a downwardly extending angled lip 53 in sliding sealing engagement with the respective heat sink flange 35. The rim defines the open top 32 of the tray 3. A cover generally designated 55 is provided for the open top of each tray, each cover having a metallic portion 57 overlying the top of the respective tray. More specifically, the metallic portion 57 of each cover comprises a generally horizontal cross wall comprising a rectangular plate of anodized aluminum sheet, for example, having downturned flanges such as indicated at 59 at each side thereof and anodized metal angles 61 extending the length thereof on each side margin. The lower edges of the downturned flanges 59 engage the top of the heat sink flanges 35. One or more of the covers 55 is/are spaced above the rims 49 of respective trays 3 at a distance no greater than one inch, more preferably no greater than about 0.40 inch, and still more preferably no greater than about 0.30 in. One or more openings such as indicated at 63 is/are provided in at least one of the covers 55 for venting moisture from each tray having such an opening or openings. FIG. 4 shows a cover having sixteen openings 63 arranged in a pattern such as illustrated. The number and pattern may vary widely; the area of the one opening in a cover having one opening and the combined area of the openings in a cover having more than one opening is preferably less than about 25% of the area of the open top of the tray 3 it is covering, more preferably less than about 5% and even more preferably less than 1% thereof. The combined areas of the openings and the specific pattern of openings in a cover will vary depending on the type and quantity of food in the tray being covered. Whatever the circumstances, the size and pattern of the opening(s) can be selected to closely control the amount of moisture vented from the tray and thus optimize the conditions for maintaining food quality over an extended period of time.

Each cover 55 is part of a system generally designated 65 for heating the food in the respective tray in addition to the primary heat source, e.g., the respective heat sink 29 and heating element 39. This auxiliary heating system 65 comprises a heat source 67 for heating the metallic portion 57 of the respective cover 55 whereby the metallic portion is adapted to emit radiant heat to the food in the respective tray for additional warming of the food in the tray 3. Each heat source 67, which is located over the respective cover 55, comprises one electric heating element 69 or more disposed in a sheet metal housing 71 affixed to an interior surface of the oven or cabinet 1. In particular the heating element 69 is a commercial item, viz., a Chromalox electrical resistance heater element sold by Carlton Company of St. Louis, Mo. The housing 71 comprises a shallow pan of sheet metal such as aluminum having a rectangular bottom 73, sides 75, ends such as indicated at 77 and flanges 79 extending out from the top of the sides.

In one embodiment, the heating element 69 lies on the bottom 73 of the pan extending lengthwise thereof. It is suitably connected in an electrical circuit such that it is adapted to heat the respective cover 55 by heating the bottom 73 of the pan 71 with attendant emission of heat from the bottom of the pan to the cover. Terminals of the heating element for connection thereof in the aforesaid circuit are indicated at 81 and 83. The pans 71 are affixed in the oven or cabinet with the bottom 73 of each pan 71 spaced above the respective cover 55 a distance less than 2.0 inches and more particularly less than about 1.0 inch. In one embodiment, the power delivered by each heat source 67 to the respective cover 55 ranges from 100-500 watts, for example, and each heat source 67 is operable to heat each cover 55 to a temperature which preferably ranges from 200° to 500° F. Pivoted locks for locking the covers 55 in the oven 1 are indicated at 85.

Figure 5:
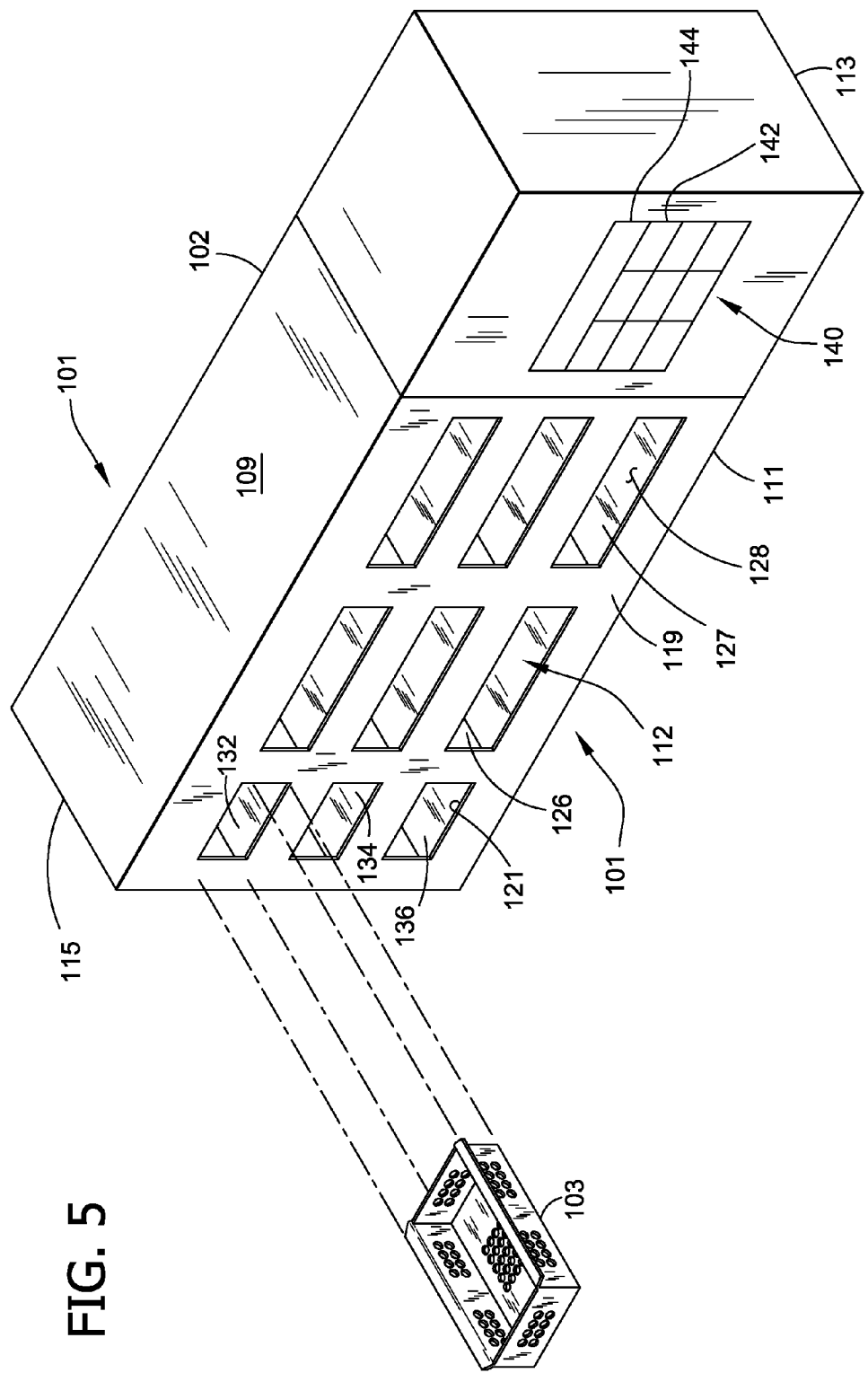
FIG. 5 is a front perspective view of another embodiment of an oven of the present invention equipped with compartments for receiving food-containing trays.

FIG. 5 illustrates a second embodiment of a holding oven of this invention, generally designated 101, comprising a generally rectangular or box-shaped cabinet 102. The cabinet 102 has a top 109, a bottom 111, opposite sides 113 and 115, a front panel 119 and a corresponding rear panel (not shown). The cabinet 102 defines an interior, generally designated 112, for removably receiving a plurality of trays, each generally designated 103. The holding oven 101 has vertical partitions 126 and horizontal partitions 127 within the cabinet 102 dividing the interior 112 thereof into a plurality of separate, thermally isolated holding compartments 128. It is to be understood that the number of vertical and horizontal partitions 126 and 127 (and thus the number of compartments 128) may vary. Preferably, the partitions 126 and 127 prevent the transfer of food flavors between the compartments 128.

The front panel 119 and rear panel contain openings, such as indicated at 121, in communication with each compartment 128. In one embodiment, the openings 121 in the front panel 119 have corresponding openings (not shown) formed in the rear panel such that each compartment 128 extends from front to rear of the oven 101 and is adapted for removably receiving one of the trays 103 from either the front or the back of the holding oven 101. The openings 121 are sized for sliding each tray 103 either into or out of the compartment 128.

Preferably, the compartments 128 and corresponding openings 121 are arranged in several tiers of compartments. As shown in FIG. 5, the holding oven has three horizontal tiers, an upper tier 132, a middle tier 134 and a lower tier 136. Each tier includes three compartments 128, with each compartment accommodating an individual tray 103. It is to be understood, however, that the number of tiers and the number of compartments in each tier may vary. In some embodiments, for example, it may be desirable to configure the holding oven 101 to have a single tier having two, three, or more compartments 128. Preferably, the entire cabinet 102 is fabricated of sheet metal material and a least the top 109, the bottom 111 and the sides 113 and 115 are of a dual wall construction to insulate the interior 112.

The holding oven 101 includes a control mechanism, generally indicated at 140, for controlling operation of the oven 101. Preferably, the control mechanism 140 has an operator input device, which in one embodiment, comprises a keypad, indicated by reference 142, and a display, indicated by reference 144, to selectively allow the operator to interact with the control mechanism to control the environment, such as the temperature and/or air flow, in each compartment 128. The control mechanism may include a separate keypad for each compartment 128. Alternately, the operator input device can include dials, switches and the like known to those in the art. For example, rotatably mounted control dials mounted on the front panel 119 and movable in a push-and-turn fashion to any user-selected positions can permit operator input to the control mechanism 140. The control mechanism 140 may also include associated indicator lights (not shown) to inform an operator of the status of a particular compartment 128 or the food within the compartment, such as whether the temperature in the compartment is at a desired temperature or whether the food in the compartment is approaching or has exceeded the desired hold time. Further operation of the control mechanism 140 will be described below.

Figure 6:
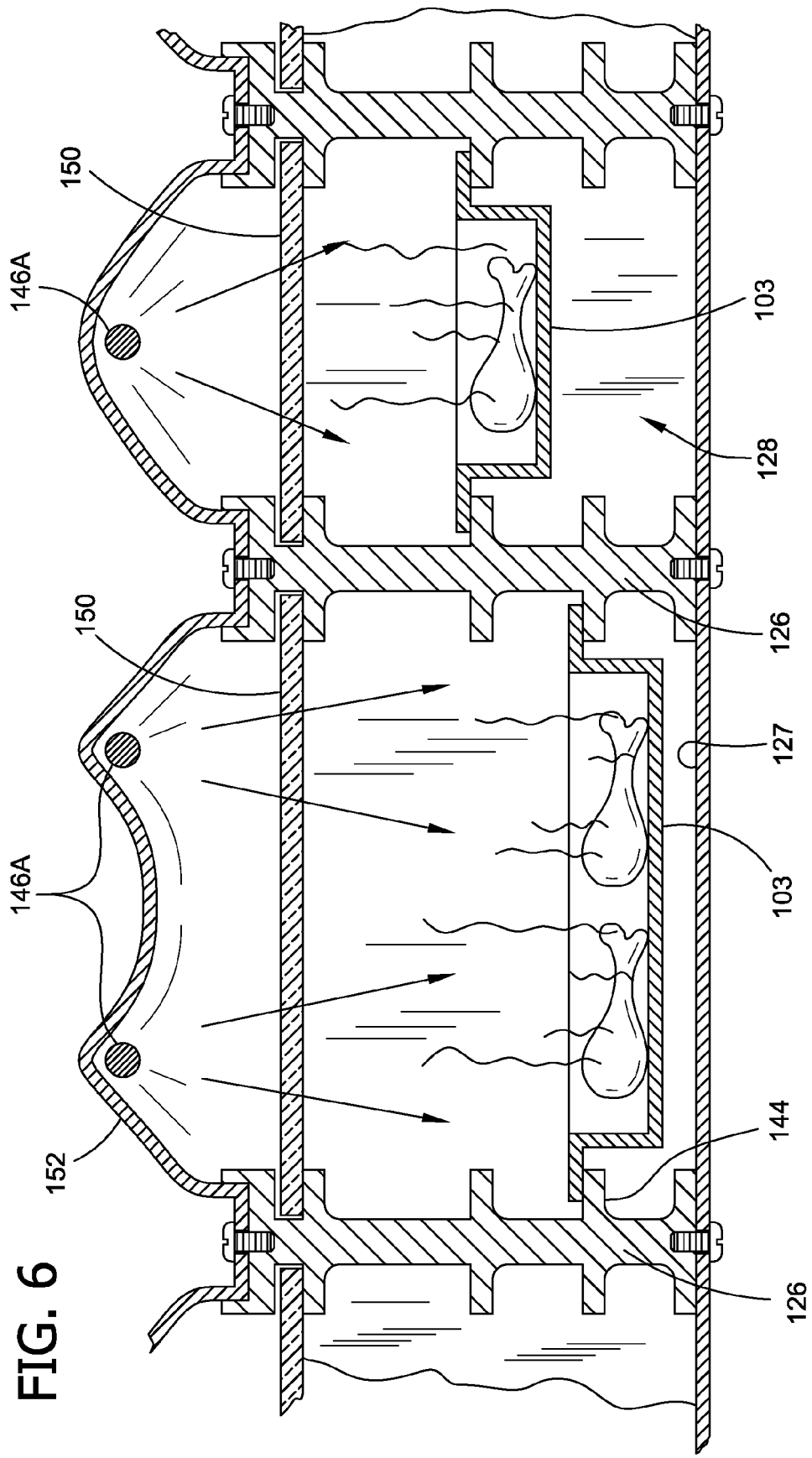
FIG. 6 is a sectional view of a portion of the oven of FIG. 5 showing trays positioned in respective compartments below heat sources.
Figure 7:
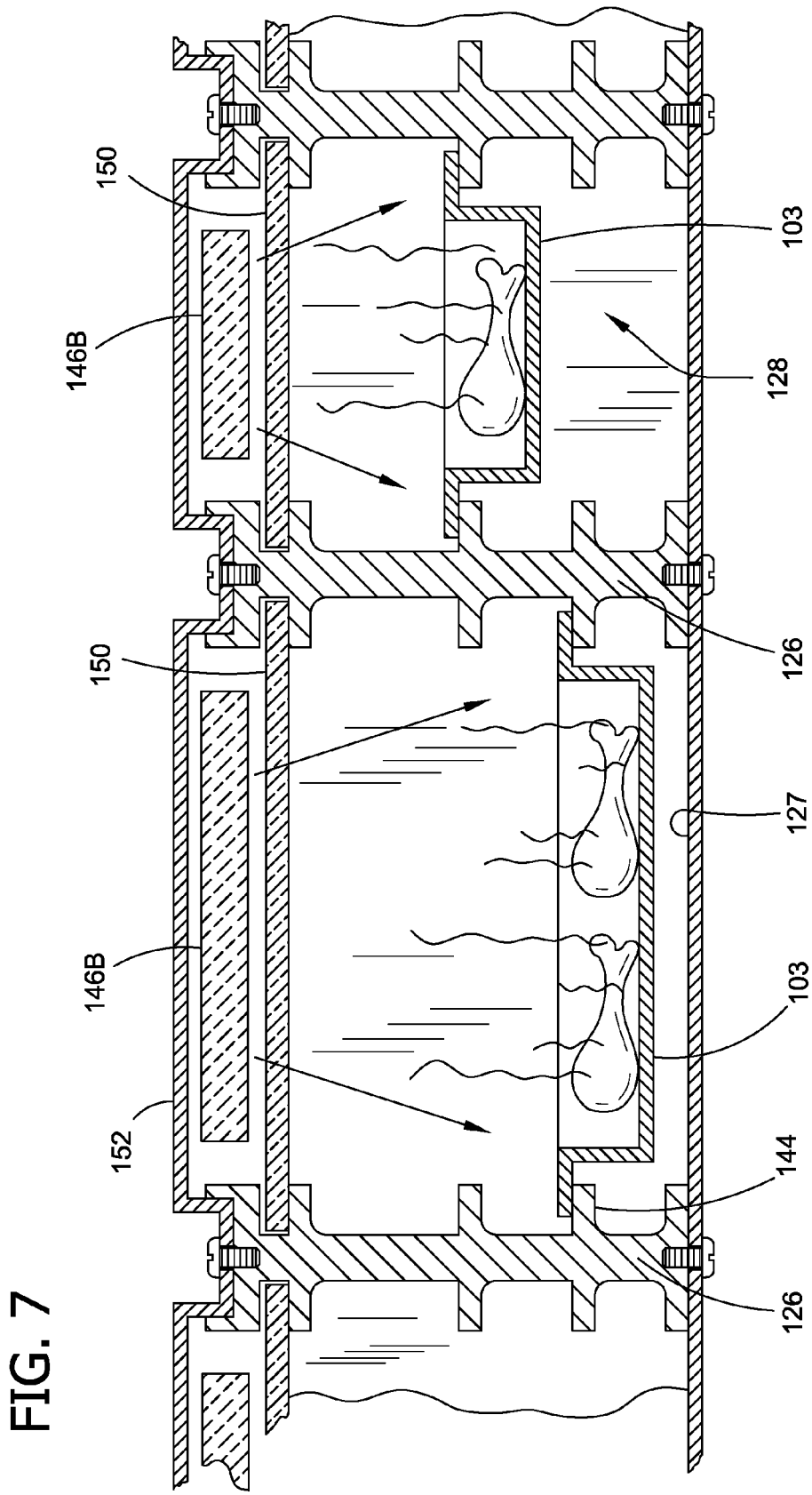
FIG. 7 is a sectional view of a portion of the oven similar to FIG. 6 showing trays positioned in respective compartments below alternate heat sources.
Figure 8:
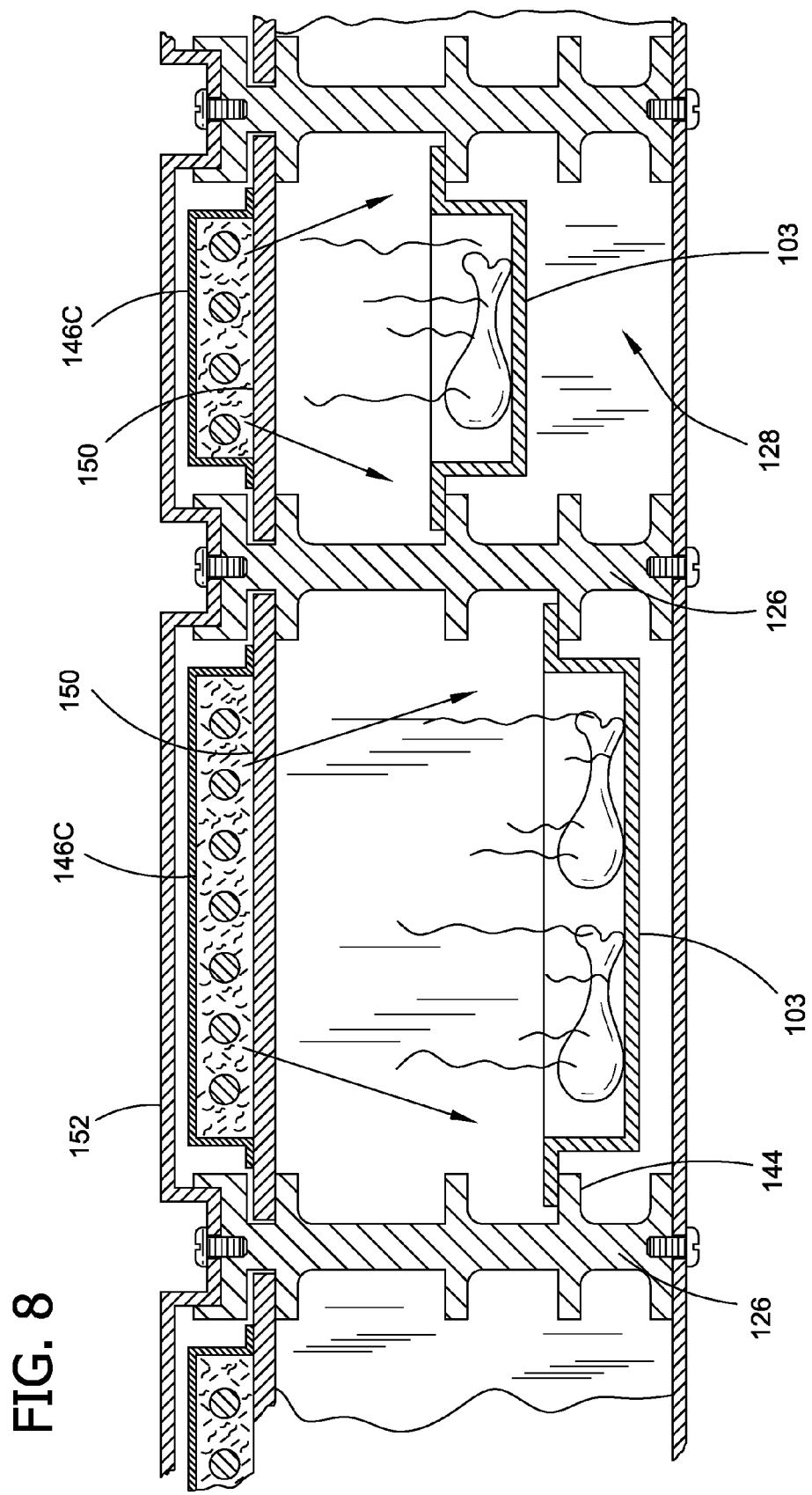
FIG. 8 is a sectional view of a portion of the oven similar to FIG. 6 showing trays positioned in respective compartments below alternate heat sources.

Referring to FIGS. 6-8, each compartment 128 has tray supports comprising, in one embodiment, inwardly (laterally) extending flanges 144 extending from the vertical partitions 126 at opposite sides of the compartment 128. The flanges 144 are vertically spaced for supporting a tray 103 at different elevations in the compartment 128. In one embodiment, the compartments 128 in the holding oven 101 have different widths and/or heights to accommodate trays of different sizes. It is contemplated that the tray supports can have other forms, such as grooves or slots in the vertical partitions 126.

Heat sources 146 positioned above respective compartments 128 are adapted to emit radiant heat into the compartments directed at the trays 103 to warm food contained therein. Each heat source 146 can function as the primary heating source for heating the respective tray 103 and cooking its food content or maintaining an already cooked food near a selected temperature. In the embodiment shown in FIG. 6, the heat source (designated 146A) is a quartz infrared heat source, but it will be understood that other heat sources may be used. For example, FIG. 7 illustrates ceramic infrared heat sources 146B and FIG. 8 illustrates resistance heating elements embedded in magnesium oxide 146C. Alternatively, halogen infrared heat sources or other sources may be used. The power delivered by each heat source 146 ranges from between about 20 and 2,000 watts, desirably between about 25 and 1500 watts, preferably between about 30 and 1000 watts, more preferably between about 35 and 750 watts and even more preferably between about 40 and 600 watts. In one embodiment, each heat source 146 delivers about 400 watts of power. Additional means for heating the holding oven 101 other than heat sources 146 can be used without departing from the scope of this invention. Reference may be made to the aforementioned U.S. Pat. Nos. 6,175,099, 6,262,394 and 6,541,739, for further details relating to the construction of certain types of equipment used for heating the trays 103 and food contained therein.

In one embodiment, a panel 150 is positioned between each heat source 146 and its respective compartment 128 to prevent the trays 103 and their contents from contacting the heat sources. In one embodiment, the panel 150 is a tempered glass cover that permits radiant energy produced by the heat source 146 to pass through into the compartment 128. In this embodiment, the panel is preferably made from transparent or semi-transparent glass. Alternately, the panel 150 can be a radiant metallic plate. In this latter embodiment, the heat source 146 is used to heat the panel 150, and the panel then radiates heat to warm the contents of the tray 103. A reflector 152 is positioned above the heat source 146 to radiate heat down toward the tray 103 below it.

Figure 9:
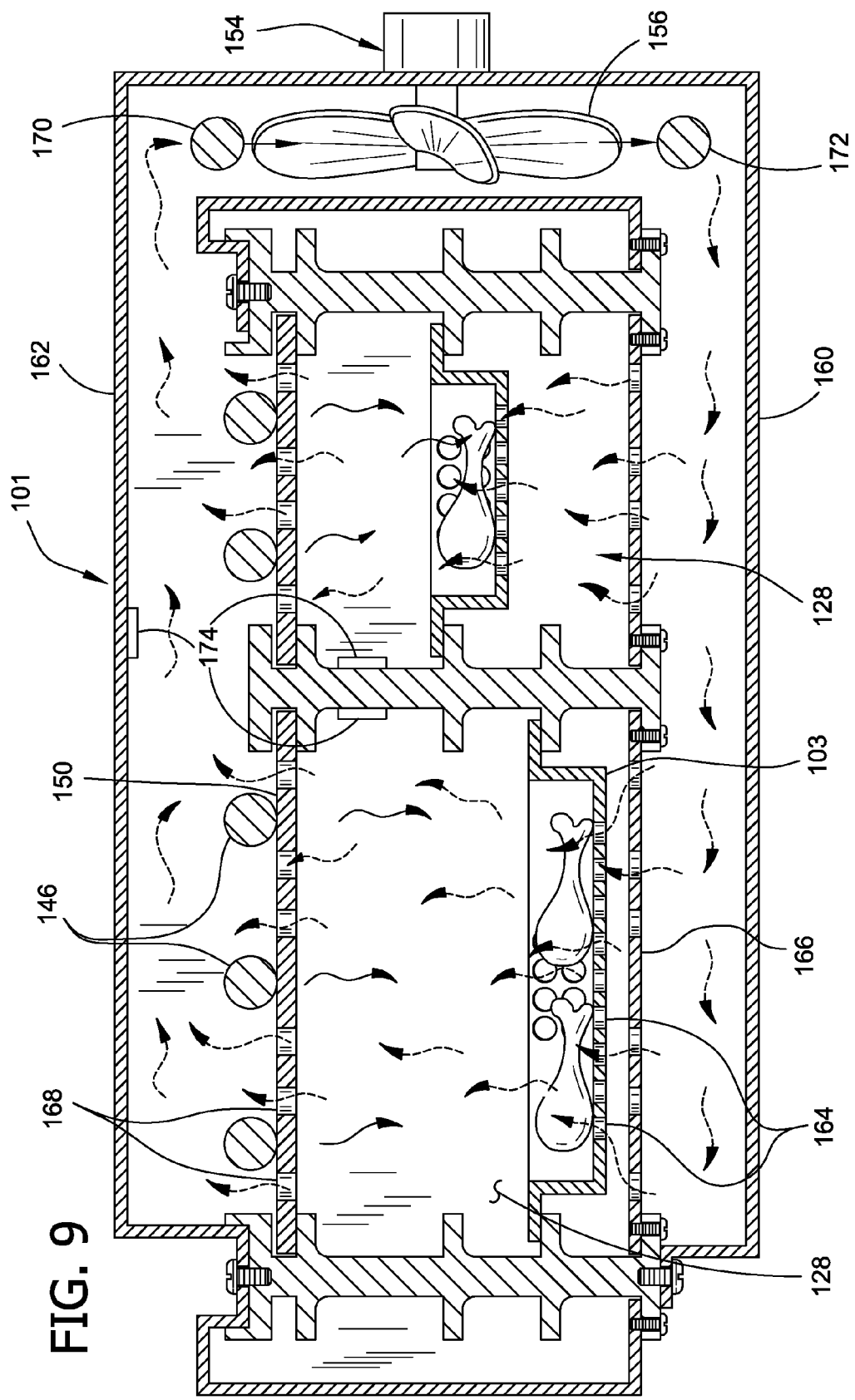
FIG. 9 is a sectional view of a portion of the oven of FIG. 5 showing a ventilation system of the oven according to an embodiment of the invention.

FIG. 9 illustrates an embodiment of the holding oven 101 having a forced air mechanism, indicated generally at 154, for delivering recirculating air into the compartments 128. The mechanism 154 comprises lower air ducting 160, upper air ducting 162, and a fan system 156 that moves air through the lower and upper air ducting air ducting. In one mode of operation, the fan system 156 circulates air in one direction along a flow path through the lower air ducting 160, into the compartments 128 and then through the upper air ducting 162 and back to the fan system. The lower air ducting 160 conveys the forced air into the compartments 128 through openings 164 located in a floor 166 of the compartments 128 below the trays 103. Air flows up from the compartments 128 into the upper air ducting 162 through one or more openings 168 in the panels 150 above the trays 103. In a second mode of operation, the fan system 156 moves air in the opposite direction through the upper air ducting 162, down into the compartments via openings 168, into the lower ducting 160 via openings 164, and then back to the fan system.

The number and pattern of openings 164, 168 in the panels 150 and floor 166 may vary widely depending on the type of heat source 146 used in each compartment 128 and the type of food in the compartment. The size and/or speed of the fan system 156 and/or the number, pattern and/or size of the openings 164, 168 associated with each compartment 128 can be varied to regulate the air flow around each tray 103 to provide optimum air flow for different food products. Additionally, the number, size and/or pattern of the opening(s) 164, 168 can be selected to closely control the amount of moisture vented from each compartment 128 and thus optimize the conditions for maintaining food quality over an extended period of time.

An upper duct heat source 170 and a lower duct heat source 172 are positioned in the respective air ducting 162,160 for heating air flowing along the selected flow path. The upper and lower duct heat sources 170, 172 heat the air that flows through the compartments so that, optionally, the food may also be warmed by convective heating. The duct heat sources 170, 172 are commercially available items, e.g., Chromalox electrical resistance heater element sold by Carlton Company of St. Louis, Mo. The duct heat sources 170, 172 may be used when additional heat is needed in the compartments 128, such as when the initial temperature is low or a large quantity of food is placed in the compartments. In one embodiment, temperature sensors 174 (FIG. 9), such as conventional resistive thermal detector type sensors known to those skilled in the art, may be positioned in each of the compartments 128 or in the air ducting 162, 160. The temperature sensors 174 provide feedback to the control mechanism 140, for example, to supply an indication of the temperature to the display 144, to control the operation of the fan system 156, or to provide indications to a warning system (not shown) that the temperature has exceeded a selected threshold. The forced air mechanism 154 can also provide recirculating air for forced cooling of the food stored in the compartment 128. FIG. 9 illustrates a holding oven with a single tier and a single forced air mechanism 154, but holding ovens 101 with multiple tiers can have separate fan systems with associated air ducting 160, 162 for each tier within the scope of the invention.

The air flow over the food in the tray 103 is controlled to enable an operator to control the amount of moisture that evaporates from the food. When the air flow direction is from the bottom to the top, i.e., from the lower air ducting 160 through the compartment 128 and into the upper air ducting 162, convection heat is applied to the food in the tray from below the tray, and infrared heat is applied from the heat sources 146 above the tray 103. By changing the direction of air flow so that air flows from top to bottom, the food can be cooked or held with a combination of convection heat and infrared heat directed from above the tray 103. Depending on the food in the tray, air flow can be maintained continuously from one direction, e.g., always from bottom to top, throughout the cook/hold cycle. Alternately, the direction of the air flow can be reversed during the cook/hold cycle so that air flow is alternately directed from the bottom and from the top of the food product. In one embodiment, the forced air mechanism 154 supplies air while the heat sources 146 are activated and is turned off when the heat sources are deactivated.

Figure 10:
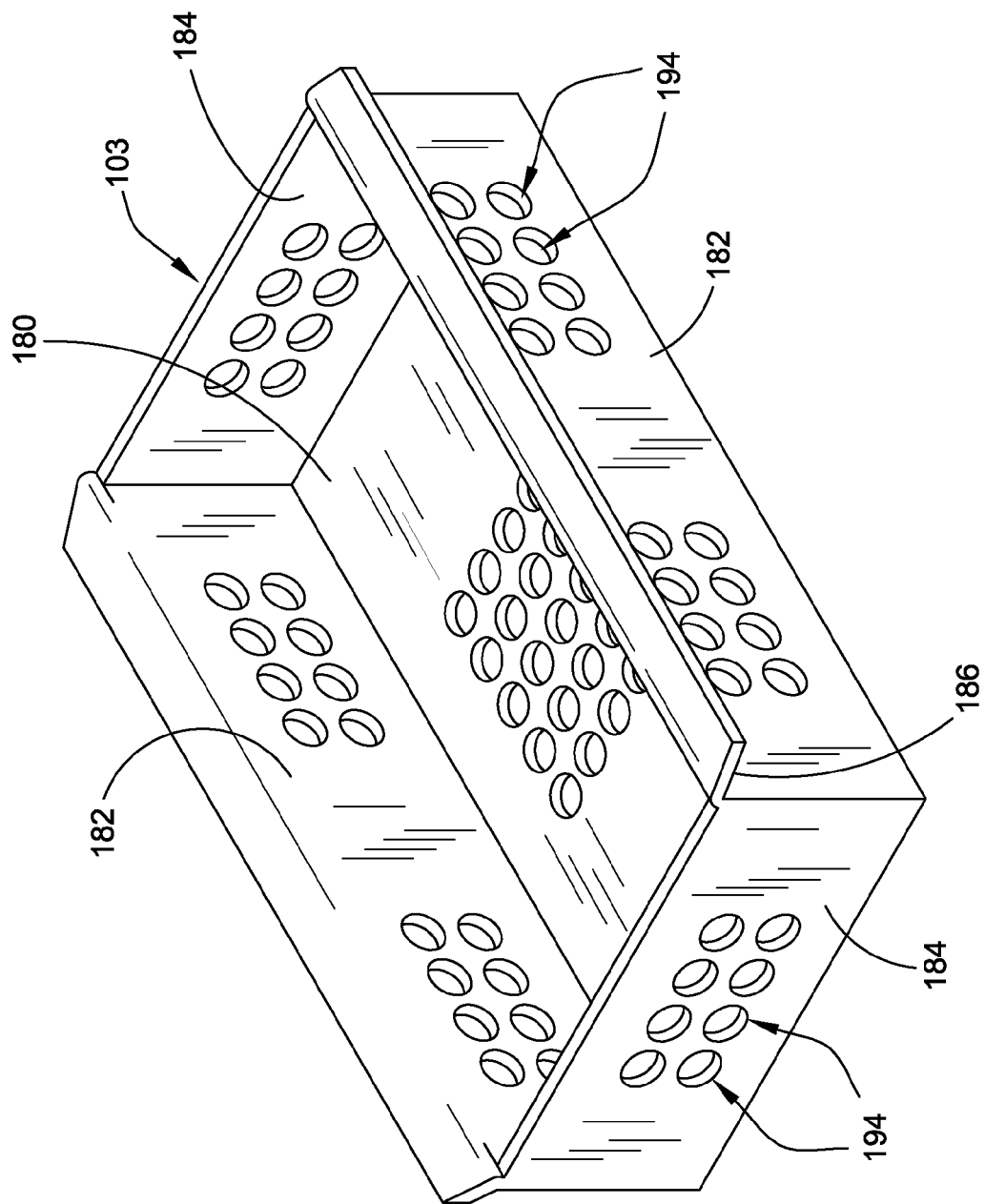
FIG. 10 is a perspective view of one embodiment of a tray used with the oven of FIG. 5.

Referring now to FIG. 10, each tray 103 is generally rectangular in plan, having a bottom 180, opposite side walls each designated 182, end walls each designated 184, and an open top. As shown, each tray 103 has a rim 186 comprising a pair of laterally extending lips 190 adapted for sliding sealing engagement with the respective support flanges 144 in a compartment. One or more openings such as indicated at 194 is/are provided in at least one of the bottom 180 and/or the side walls 182 and end walls 184 for allowing air to circulate through the tray 103 to vent moisture from each tray. FIG. 10 shows a tray having sixteen openings 194 in the bottom 180 and each side wall 182 and 8 openings 194 in each end wall 184 arranged in a pattern such as illustrated. It is contemplated that the number, pattern and size of openings 194 may vary widely. For example, the openings 194 in the tray 103 may be circular, oval, square or other shape and each opening may have an area of between about 0.1 and about 1.0 square inch. It is desirable that the combined area of the openings 194 in the tray is less than about 50% of the area of the open top of the tray 103, preferably less than about 25% and more preferably less than about 10% thereof. Also, it is contemplated that different trays 103 within the oven 101 may have different patterns of openings 194. The combined areas of the openings 194 and/or the specific pattern of openings in the tray 103 will vary depending on the type and quantity of food in the tray 103. Whatever the circumstances, the size and pattern of the opening(s) 194 can be selected to closely control the amount of moisture evaporated from the tray 103 and thus optimize the conditions for maintaining food quality over an extended period of time.

The control mechanism 140 is used to selectively control the environment, such as the temperature and/or air flow, in each compartment 128 of the holding oven 101. As will be described more fully hereafter, the control mechanism 140 is operable to vary the amount of radiant heat as needed to maintain the food at a desired holding temperature to preserve the quality of the food for a longer period of time. As used herein, the term "selected holding temperature" means either a single substantially constant temperature (e.g., 180° F.) or a range of temperatures (e.g., 160-180° F.) In one embodiment, the control mechanism comprises suitable timer and duty cycle controls to control the duty cycle of each heat source 146, the term "duty cycle" meaning the ratio of heat source on-time to heat source on-time plus heat source off-time. Alternatively, the duty cycle of the heat source can be expressed as a percentage of time during which the heat source is "ON". For example, if the heat source is activated for ten seconds and de-activated for 90 seconds, the activated for ten seconds and de-activated for 90 seconds, and so on, the duty cycle is 10/100 (1/10), or 10%. The control mechanism 140 uses a suitable microprocessor and appropriate software to control relays 198 (FIG. 11) that activate the heat sources 146, 170 and 172 and fans 156.

Figure 11:
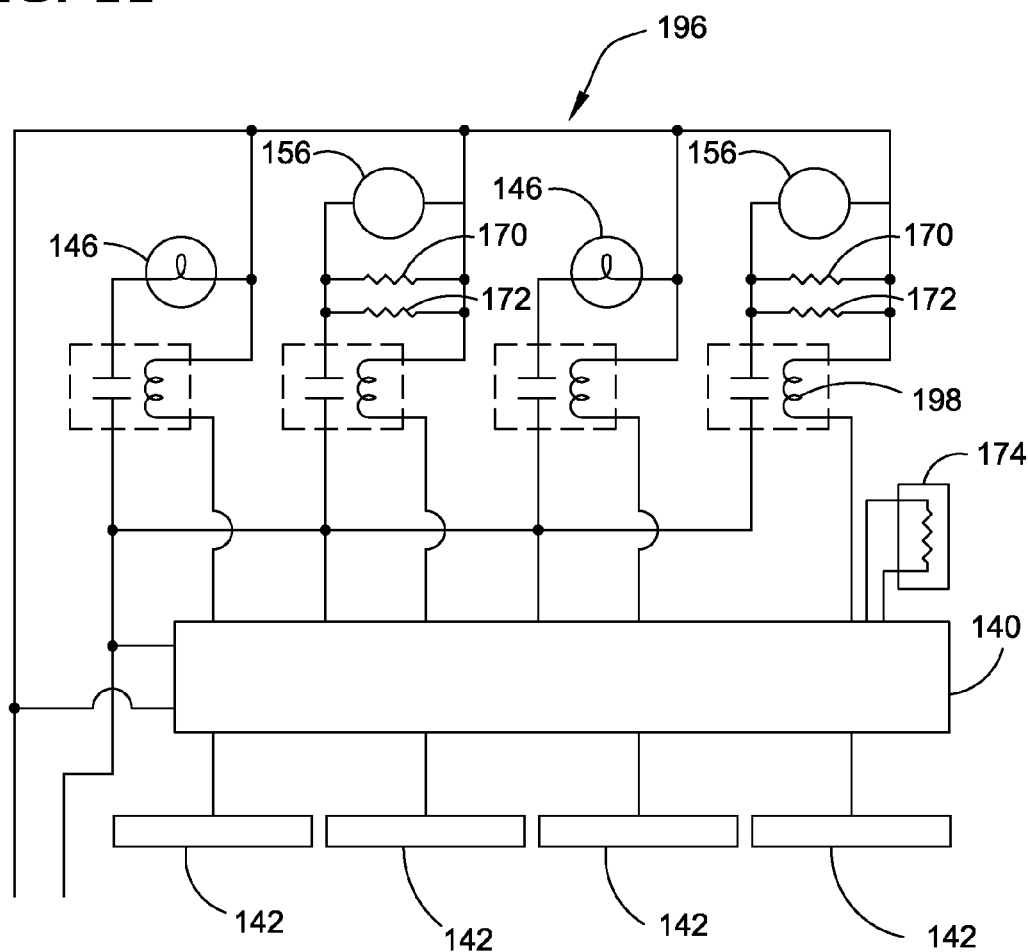
FIG. 11 is a schematic diagram of one embodiment of a control circuit of the oven of FIG. 5.

FIG. 11 is a simplified schematic of a portion of one embodiment of an oven control circuit, generally indicated at 196, that is controlled by the control mechanism 140. The circuit 196 operates the heat sources 146 in the multiple compartments 128 of the holding oven and the heat sources 170, 172 in the upper and lower ducting 160, 162. In the embodiment shown, the control mechanism 140 regulates the heat sources in the holding oven 101 by energizing conventional relays 198. Other circuit designs may be used. It is understood that the control mechanism 140 may independently operate the heat sources 146 in the compartments 128, such that the heat source 146 for one compartment may be actuated while the corresponding heat source for another compartment is at a different level of activation or deactivated. Additionally, the control mechanism 140 may independently operate the upper and lower duct heat sources 170, 172 such that neither, one or both heat sources in a flow path may be operating, and such that, for example, the top heat source may be operated in one tier while the bottom heat source may be operated in another tier. Using a keypad 142 or other suitable operator input device, the control mechanism 140 can be programmed to control the heat sources 146, 170 and 172 to adjust various parameters, such as, for example, the ambient hold time, the heated hold time, the total hold time, the percentage heater on time, the time base of the duty cycle, the cook or rethermalization time, and/or the temperature, as more fully described below. As such, the control mechanism 140 controls operation of the heat sources 146 independent of one another so that the temperature in each compartment 128 may be independently controlled.

Typically, the holding oven 101 will operate in at least two modes. In a first "cool down and hold" mode, the initial temperature of the food placed in the holding oven is higher than the desired holding temperature of the food, as is typically the case when the food has just been cooked in a cooking appliance (e.g., cooking or baking oven, frier, etc.) and then is transferred to the holding oven. In this mode, the control mechanism 140 is operable to maintain the heat source in a respective compartment 128 deactivated (or at a low level of activation) while the pre-cooked food in the compartment 128 cools down to the selected holding temperature during a duration of non-heated holding time, and for then controlling the heat source 146 in the compartment 128 to maintain the food in the compartment 128 at or near the selected holding temperature for a duration of heated holding time. In a second "heat up and hold" or "rethermalizing" mode, the initial temperature of the pre-cooked food placed in the oven is lower than the desired holding temperature of the food, as where the food has been cooked and then refrigerated before placement in the holding oven. In this mode, the control mechanism 140 is operable to activate the heat source in the compartment 128 to raise the temperature in the compartment 128 to the selected holding temperature during a duration of rethermalizing holding time, and for then controlling the heat source 146 in the at least one compartment 128 to maintain the food in the compartment 128 at the selected holding temperature for the duration of heated holding time. It will be understood that the oven 1 of FIG. 1 can be used in a similar manner without departing from the scope of the invention.

Figure 12:
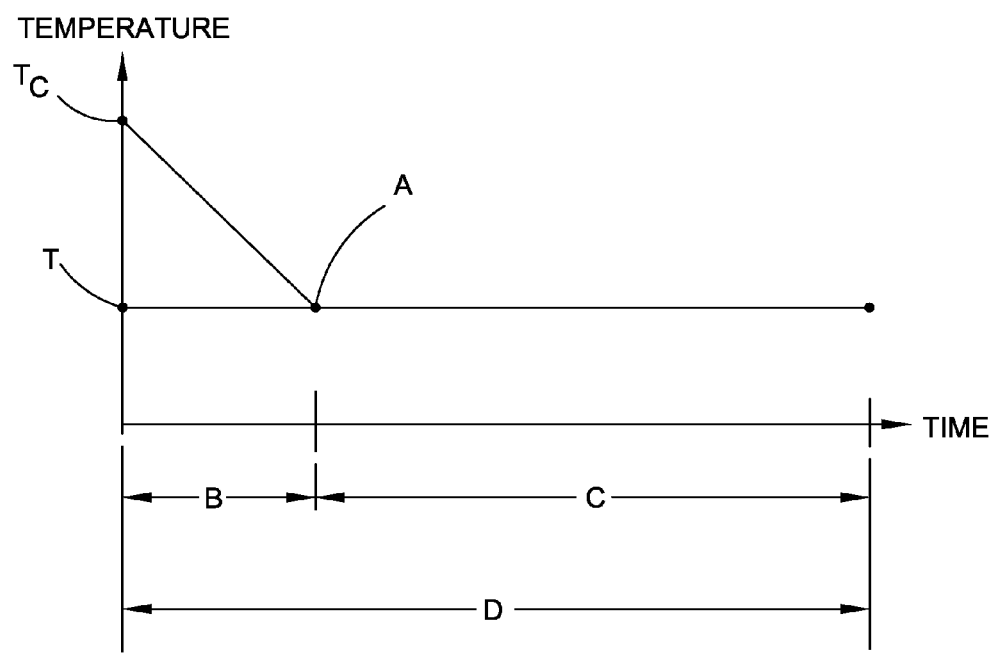
FIG. 12 is a diagram of a time vs. temperature curve illustrating one mode of operation of the oven of FIG. 5.
Figure 13:
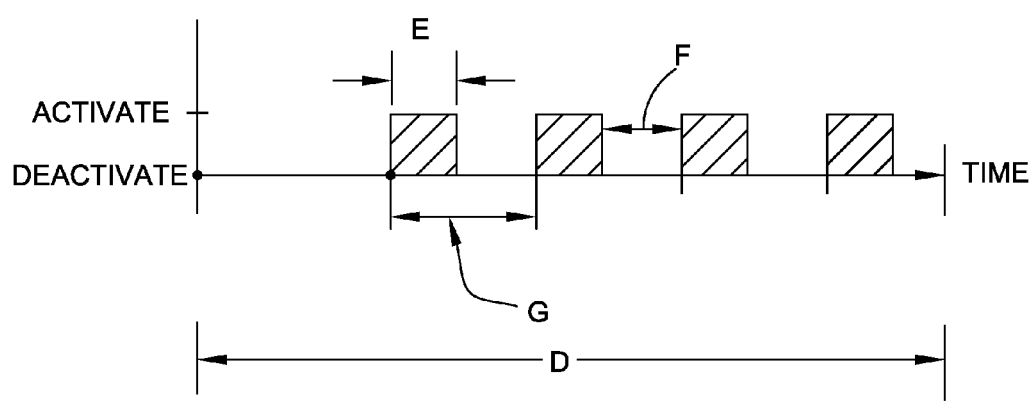
FIG. 13 is a time vs. heat source activation curve for the mode of operation depicted in FIG. 12.

FIGS. 12 and 13 illustrate an example of the operation of the holding oven 101 in the first (cool down and hold) mode. In particular, FIG. 12 illustrates a time vs. temperature curve for a complete duration of holding time D for one compartment 128 of the oven 101, and FIG. 13 illustrates a time vs. activation curve for the heat source 146 of that same compartment during the holding time duration D. The time vs. temperature curve of FIG. 12 plots the temperature of the food product as a function of time. One skilled in the art will understand that this curve can be different for each type of food product to be held in the oven 101.

In a cool down and hold situation, a food product is typically cooked as by frying, grilling, baking, etc., in a cooking appliance until a desired high internal temperature, usually between about 170 and 210 degrees Fahrenheit (° F.), is achieved. After the food is cooked, the food product is placed in a tray 103 and inserted into compartment 128 in the oven 101. Alternatively, the pre-cooked food can be placed in the oven without the use of a tray. Using the keypad 142 or other input device, the operator selects a desired holding temperature, indicated at T, which will be lower than the temperature Tc of the food initially placed in the compartment. The holding temperature T is the desired temperature for maintaining the pre-cooked food to preserve taste, appearance and/or other food quality. The operator also selects a duration of holding time D. The duration of holding time D is the total time the food is to be held in the oven 101 and maintained at a desired quality level. Alternatively, the control mechanism 140 can be programmed so that the operator need only select the type of food to be placed in the compartment and the control mechanism 140 automatically uses preselected (programmed) settings for that type of food.

In general, when the holding oven is operating in the cool down and hold mode, it is desirable that food introduced into the oven be allowed to quickly cool down to the selected holding temperature, and that the food be held at this temperature thereafter. Thus, the duration of holding time D may comprise an ambient hold time, i.e., a period of non-heated cool-down time such as indicated at B in FIG. 12, during which time the food product is allowed to cool to the desired holding temperature T. Preferably, during the ambient hold time B, heat source 146 is either in a deactivated state or a state in which it is delivering a relatively low quantity of radiant heat to the food so that the food product may cool down more rapidly than if the heat source was at full power. The food product is allowed to cool for the ambient hold time B until it reaches the desired hold temperature T as illustrated at point A. In one embodiment, forced air flow from the forced air mechanism 154 (FIG. 9) can be used to more rapidly decrease the temperature. After the internal temperature of the food decreases to the desired hold temperature T, the food is held near the desired hold temperature to preserve food quality for a period of heated hold time, indicated at C, comprising the remaining portion of the holding time duration D. During the heated holding time C, the heat source 146 may be operated in duty cycles to apply the appropriate amount of radiant heat to the food. Additionally, the control mechanism 140 controls the heat sources 170, 172 and the fan system 156 to maintain the internal food temperature at or near the desired hold temperature T during the heated hold time C.

FIG. 13 illustrates an embodiment in which the heat source 146 is successively activated and deactivated in a controlled sequence or duty cycle, indicated at G, to maintain the temperature in the compartment 128 near the selected holding temperature T. In this particular embodiment, each duty cycle G comprises a heating interval E during which time the heat source 146 is activated followed by a non-heating interval F during which time the heat source is deactivated. The time-base of the duty cycle G is the time required to complete one cycle of activation and deactivation of the heat source 146 as shown in FIG. 13. In one embodiment, the time-base of the duty cycle G and the percent on time of the heat source 146 (i.e., the duration of heating interval E divided by the time-base of the duty cycle G expressed as a percent) maintains the actual temperature within the compartment 128 within at least about 15 degrees of the desired temperature, preferably within at least about 10 degrees, more preferably within about 5 degrees, and even more preferably within about 2 degrees of the desired temperature.

The operator is able to set various parameters using the keypad 142 or other input device of the control mechanism 140, such as the ambient hold time delay B, the heating interval E, the time-base of the duty cycle G, and/or total hold time D. These parameters can be selected by the operator or preset (programmed) for the type of food product in the compartment 128 so that the operator need only select the proper food product. The control mechanism 140 in an oven 101 having more than one compartment 128 can control the duty cycle of the heat source 146 in each compartment to maintain the temperatures in the compartments at different levels.

Using the keypad 142 or other input device, an operator can also control the operation of the forced air mechanism 154 (FIG. 9) by activating the fan system 156 or selecting the direction of forced air flow. In one embodiment, forced air flow from the forced air mechanism 154 conveys convective heating air into the compartments 128 at locations below the trays 103 for flow in a generally upward direction toward the trays 103. Alternately, the ventilation system conveys heating air into the compartments 128 at locations above the trays 103 for flow in a generally downward direction toward the trays 103. The fan system 156 can be operated such that heating air is circulated through the compartments 128 in one direction and then the direction of air flow is reversed to circulate heating air through the compartments 128 in the opposite direction. Using the keypad 142 or other input device of the control mechanism 140, the operator is able to select the duration that the fan system 156 circulates air through the compartments 128. For example, in one embodiment, the forced air mechanism 154 operates in a controlled sequence during the duty cycle G such that the fan system 156 is activated when the heat sources 146 are activated and is deactivated when the heat sources are deactivated. Alternately, the fan system 156 can be continuously activated for the duration of the total hold time D or can be activated so that the fan system is on a desired percentage of the duty cycle G independent of the heat sources. Preferably, the fan system 156 is activated a suitable percentage of the time to control the evaporation of moisture from the food in the compartment 128. The percentage of time the fan system 156 is activated desirably depends on the type and/or the amount of food placed in the compartment 128. The percentage of time the fan system 156 is activated and the direction of air flow can be selected by the operator or preset for the type of food product in the compartment 128 so that the operator need only select the proper food product. Additionally, the vertical position of at least one tray 103 in a respective compartment 128 may be varied.

Set forth below are exemplary oven settings for particular food products when the oven is operating in a cool down and hold mode.

EXAMPLE 1

Fried Chicken Nuggets

| | |
|---|---|
| Ambient hold time delay (B) = | 10 minutes |
| Hold temperature (T) = | 180° F. |
| Time-base of duty cycle (G) = | 120 seconds |
| Percent on time (E) = | 50% |
| Total hold time (D) = | 60 minutes |

EXAMPLE 2

Fried Apple Turnover

| | |
|---|---|
| Ambient hold time delay (B) = | 25 minutes |
| Hold temperature (T) = | 200° F. |
| Time base of duty cycle (G) = | 120 seconds |
| Percent on time (E) = | 40% |
| Total hold time (D) = | 240 minutes |

Figure 14:
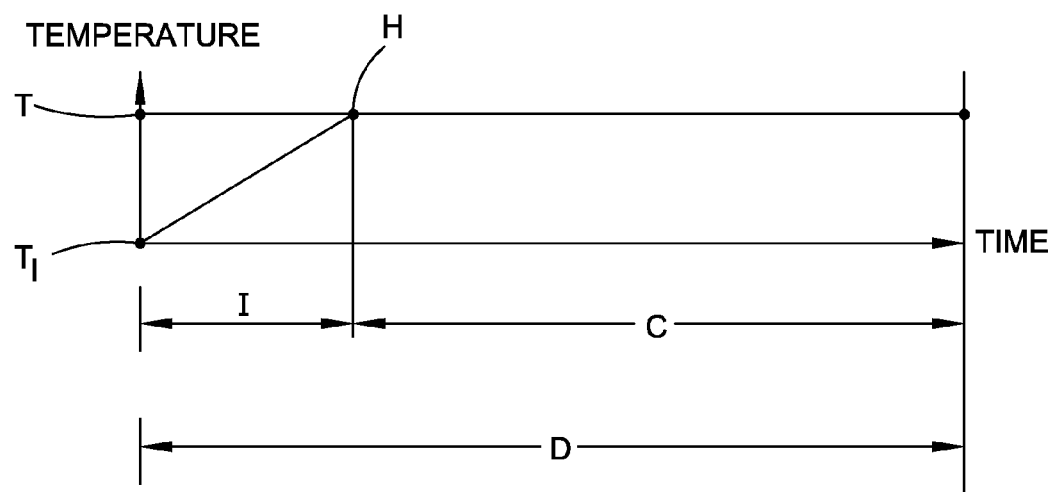
FIG. 14 is a diagram of a time vs. temperature curve illustrating a different mode of operation of the oven of FIG. 5.
Figure 15:
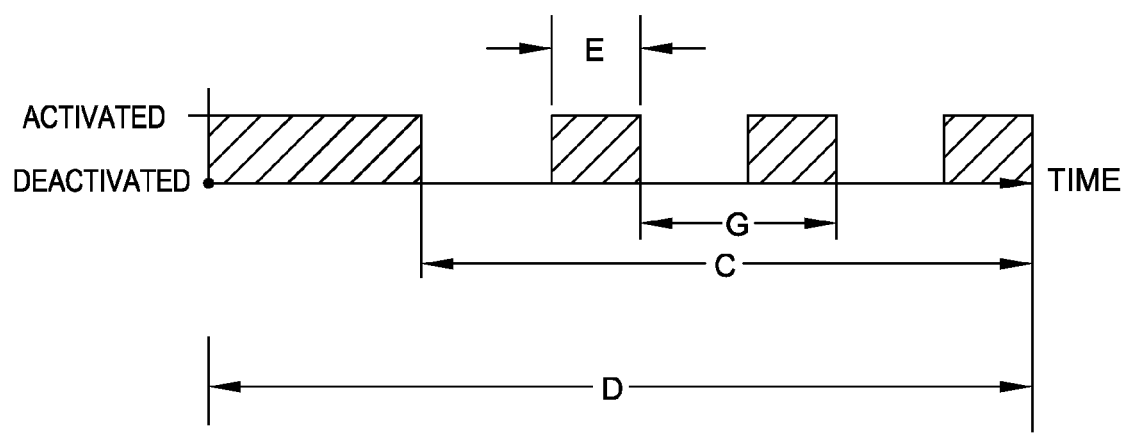
FIG. 15 is a time vs. heat source activation curve for the mode of operation depicted in FIG. 14.
Figure 16:
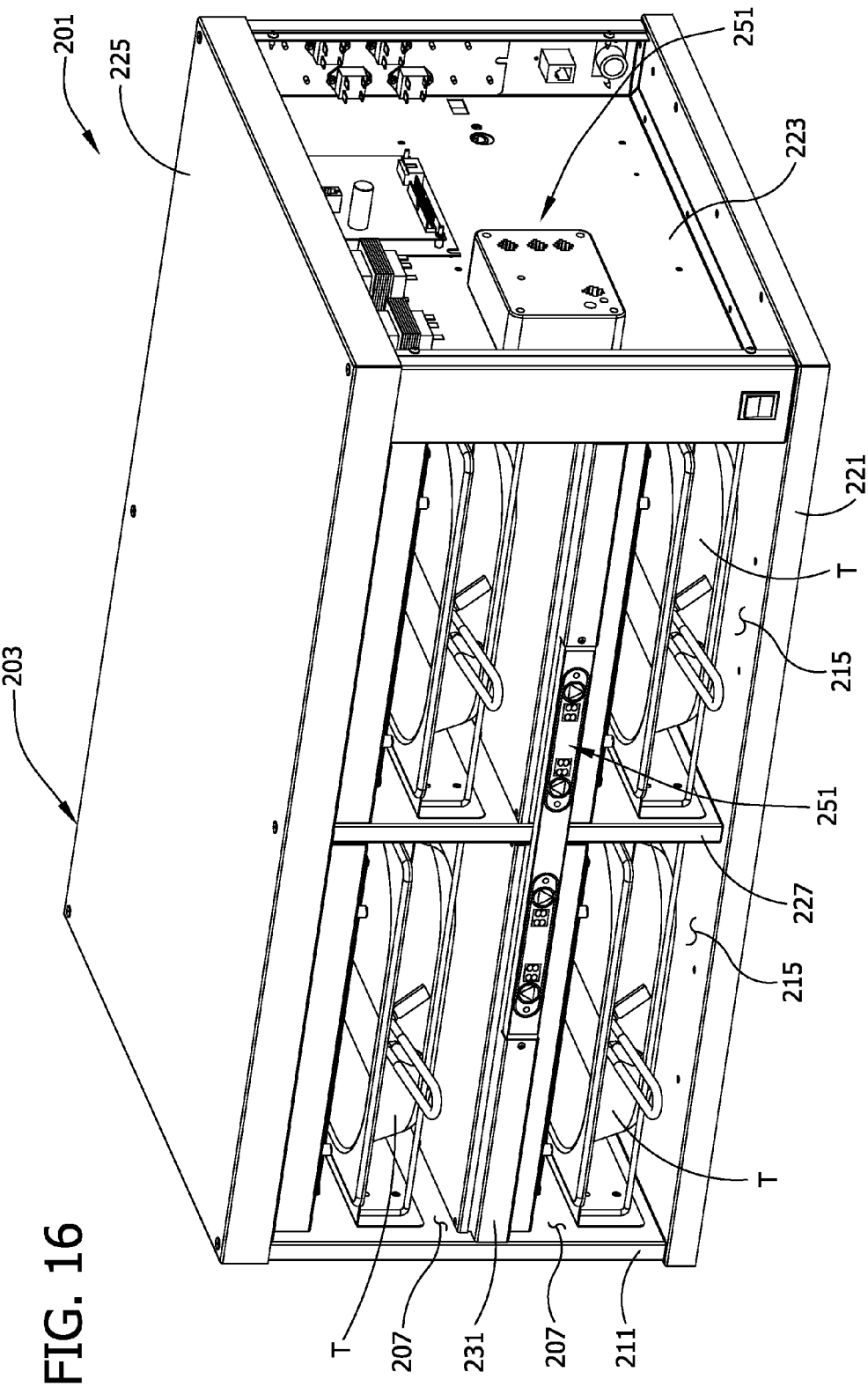
FIG. 16 is a perspective of a different embodiment of a holding oven of this invention.
Figure 17:
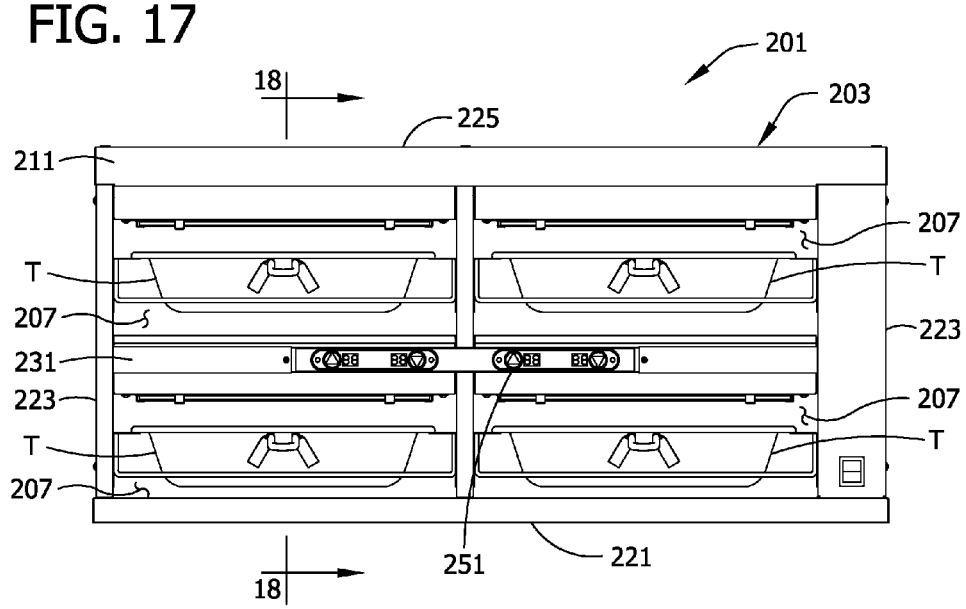
FIG. 17 is a front elevation of the holding oven of FIG. 16.
Figure 18:
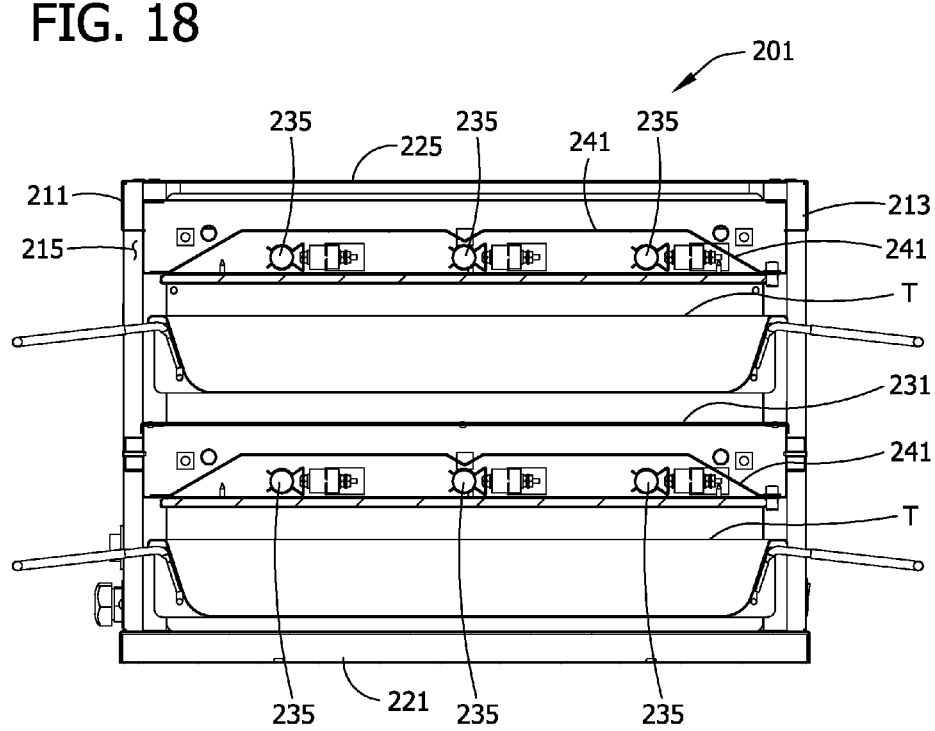
FIG. 18 is a section on line 18-18 of FIG. 17.

FIGS. 14 and 15 illustrate an example of the operation of the oven 101 in the second (heat up and hold or rethermalizing) mode. In particular, FIG. 14 illustrates a time vs. temperature curve for a complete hold cycle D for one compartment 128 of the oven 101, and FIG. 15 illustrates a time vs. activation curve for the heat source 146 of that same compartment during the hold cycle D. The time vs. temperature curve of FIG. 14 plots the temperature of the food product as a function of time. One skilled in the art will understand that this curve can be different for each type of food product to be held in the oven 101.

In this mode, the oven 101 is used to raise the temperature of a food product to a selected temperature and hold the food product at the selected temperature. A tray 103 containing a food product at an initial temperature $T_I$ is placed into the compartment 128. (Temperature $T_I$ may vary from a frozen or refrigerated temperature to ambient or above.) Using the keypad 142 or other input device, the operator selects a desired holding temperature T (which will be higher than the initial food temperature $T_I$), and a duration of holding time D. Alternatively, the control mechanism 140 can be programmed so that the operator need only select the type of food to be placed in the compartment and the control mechanism 140 automatically uses preselected settings for that type of food. In either case, the control mechanism is operable to activate the heat source 146 to raise the temperature of the food product for a duration of heat-up or rethermalization time, indicated at I, the food reaching the holding temperature T at time H. The heat source 146 is then activated and deactivated during the heated holding time C for successive duty cycles G to maintain the food in the compartment 128 at the selected holding temperature T for the duration the total hold time D. In one embodiment, the duration of the heated holding time C includes intervals of the duty cycle G when the heat source 146 is activated (as indicated at E in FIG. 15) and intervals during which the heat source is deactivated (as indicated at F in FIG. 15), as described above.

Set forth below are exemplary oven settings for particular food products when the oven is operating in a heat-up and hold mode.

EXAMPLE 3

Diced Frozen Chicken

| | |
|---|---|
| Rethermalization time (I) = | 40 minutes |
| Hold temperature (T) = | 220° F. |
| Time-base of duty cycle (G) = | 180 seconds |
| Percent on time (E) = | 50% |
| Total hold time (D) = | 160 minutes |

EXAMPLE 4

Refrigerated Beef BBQ

| | |
|---|---|
| Rethermalization time (I) = | 30 minutes |
| Hold temperature (T) = | 210° F. |
| Time base of duty cycle (G) = | 180 seconds |
| Percent on time (E) = | 30% |
| Total hold time (D) = | 240 minutes |

With the heating system of the present invention and the capability of controlling the evaporation of moisture from the trays 103, the holding time (D) for fast service cooked foods such as chicken and french fries is substantially increased, and good texture and taste are maintained. In this respect, controlling the rate of evaporation of moisture from chicken, for example, precludes drying out and toughening of the chicken fibers and precludes the breading from becoming dry and greasy. And with respect to french fries, for example, development of a dry, rubbery texture as moisture is lost and the outer skin loses crispness is precluded.

In the embodiments described above, the control mechanism 140 uses a duty-cycle system to control the amount of radiant heat delivered to the pre-cooked food by the heat sources. In this type of system, the percentage of heater on and off time is adjusted to vary the radiant energy as needed to maintain the food at the suitable holding temperature. It will be understood, however, that the control mechanism 140 can vary the amount of radiant energy delivered to the food in other ways. For example, the heat sources 146 may be variable-power heaters operable to deliver radiant heat at multiple discrete energy levels or at an infinite number of levels between full-power and zero power (as by varying the voltage to the heaters), and the control mechanism 140 may operate to increase and decrease the radiant heat delivered by the heaters in a controlled, pre-programmed manner to maintain a particular food at its ideal holding temperature.

The particular program used by the control mechanism 140 to control a heat source 146 for any given type of food may be determined empirically. Alternatively, the control mechanism 140 can include one or more sensors and one or more appropriate feedback loops for each compartment or group of components of the holding oven. For example, in one embodiment, at least one sensor is used in each compartment to detect a characteristic indicative of the temperature of the food in the compartment, and the control mechanism is responsive to signals received from the at least one sensor to control the heat source 146 to vary the radiant heat delivered to the pre-cooked food to maintain it at a holding temperature appropriate for that food. The characteristic detected by the one or more sensors may be the temperature of the air in the compartment, or the temperature of a surface in the compartment, or the radiant IR energy emitted by the food in the compartment, or some other characteristic. Thus, the sensor may be a standard temperature sensor, or an IR emissions detector, or some other type of detector capable of detecting the aforesaid characteristic indicative of the temperature of the food in the compartment.

FIGS. 16-21 show another embodiment of food warming apparatus of this invention, generally designated 201. The apparatus comprises a cabinet 203 having two horizontal tiers of compartments, two compartments per tier (each compartment being designated 207). It will be understood that the number of tiers can vary from one to any number more than one, and that the number of compartments 207 in each tier may vary from one to any number more than one. In the particular embodiment shown, each compartment is sized to receive a single (only one) tray T, but it will be understood that each compartment 207 may be sized to receive more than one tray, or that some compartments may be sized to receive one tray and other compartments more than one tray. In other embodiments (to be discussed later), food is placed in one or more compartments 207 without the use of a tray.

The cabinet 203 has front and back panels 211, 213 with openings 215 aligned with the compartments 207 in the cabinet to allow food (either in or out of trays T) to be placed into the compartments and removed from the compartments from both ends of the compartments. The cabinet also has a bottom wall 221, side walls 223, a top wall 225, a vertical partition or divider 227 extending between the top and bottom walls of the cabinet to separate the two compartments 207 in each tier, and a horizontal partition or divider 231 extending between the side walls 223 to separate the compartments in the upper tier from the compartments in the lower tier. As a result, the interior of the cabinet is divided into a plurality of separate holding compartments 207, and each compartment is completely enclosed on opposite sides, top and bottom so that food flavors are prevented (or at least inhibited) from transferring between compartments. Suitable thermal insulation (not shown) is provided adjacent the walls of each compartment 207.

Figure 19:
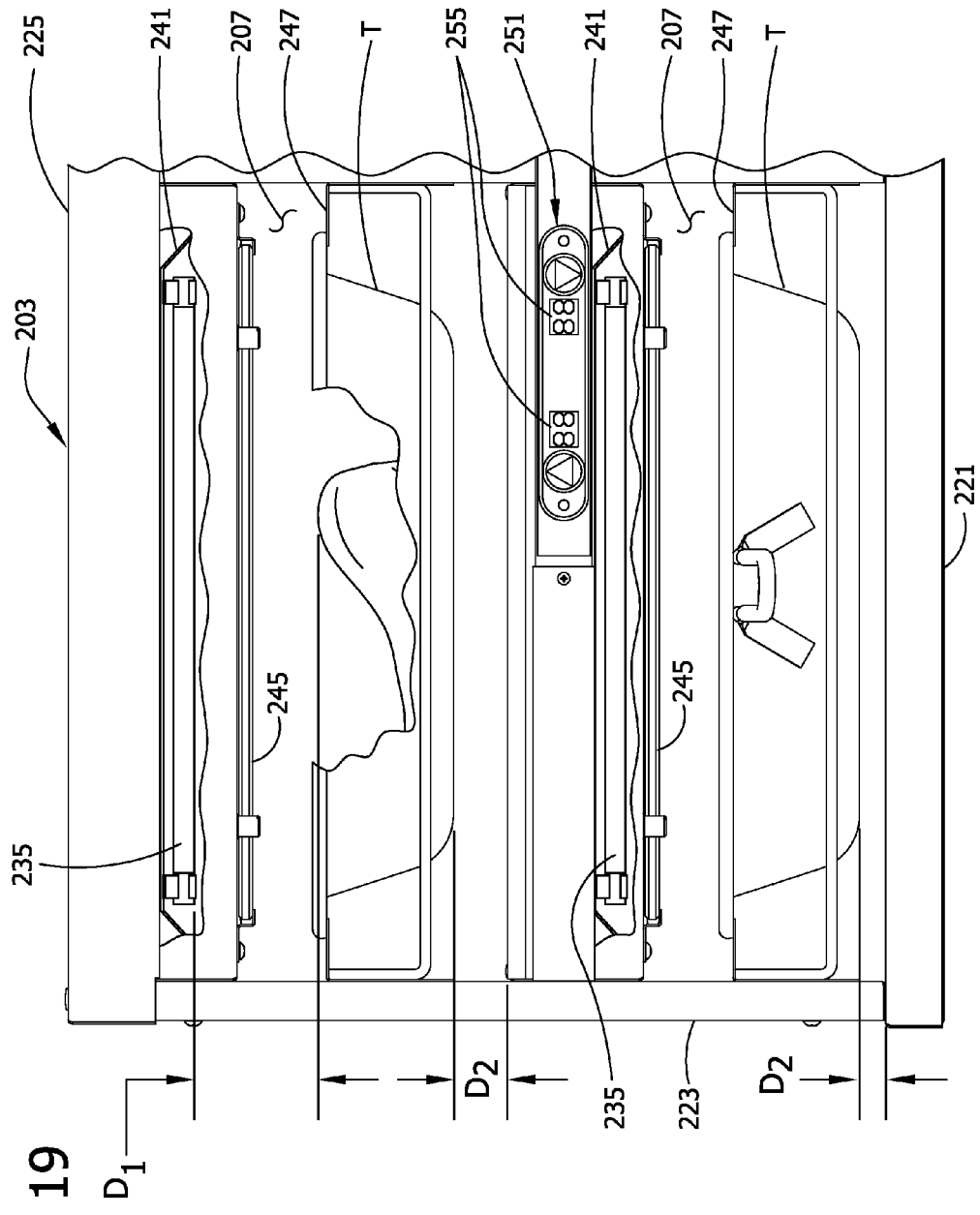
FIG. 19 is an enlarged portion of FIG. 17 with parts broken away to show the distance D1 between the food in the oven and a heat source of the oven.
Figure 20:
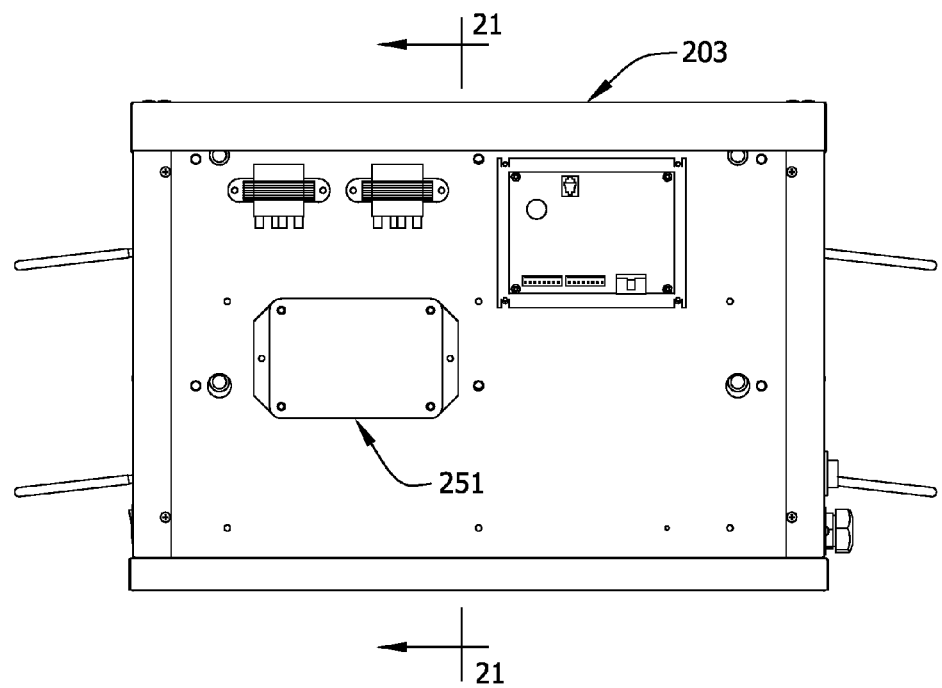
FIG. 20 is a right-side elevation of the holding oven of FIG. 16.
Figure 21:
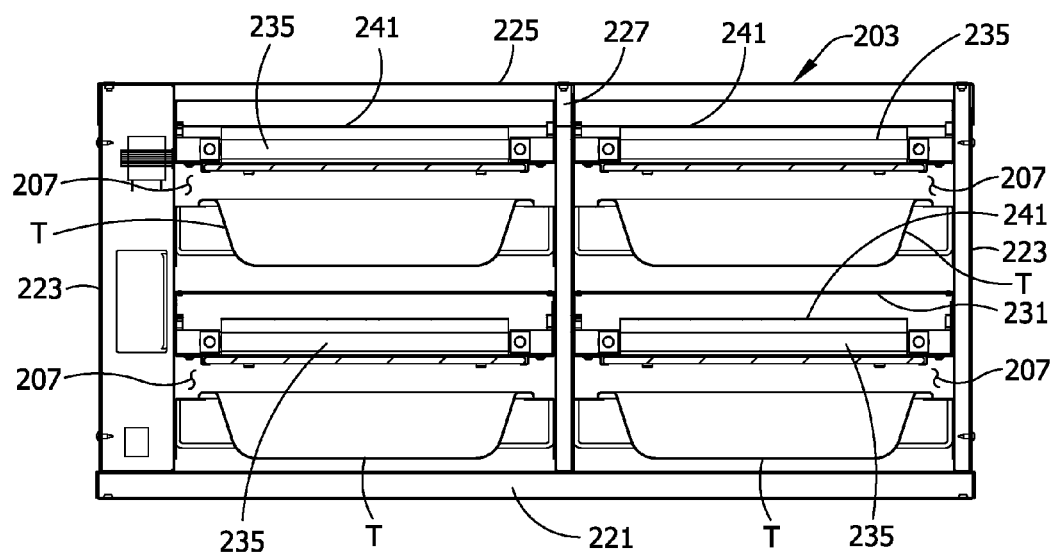
FIG. 21 is a section on line 21-21 of FIG. 20.

As shown in FIG. 19, for example each compartment 207 has a heat source 235 for emitting radiant heat down on pre-cooked food in the compartment. As noted previously, this heat source 225 may comprise one or more IR heat lamps or the like, each mounted by a suitable fixture adjacent to the top wall of the compartment. A reflector 241 is provided in each compartment 207 over the best source 235 for reflecting radiant heat in a generally downward direction through a cover panel 245 of suitable material capable of transmitting the heat (e.g., glass). The food in the compartment 207 is positioned a distance D1 below the heat source 235, as shown in FIG. 19. Distance D1 is desirably relatively small to reduce or minimize the size (e.g., vertical height) of the cabinet 203. In one embodiment, for example, distance D1 is less than 12 in.; in another it is less than 11 in.; in another it is less than 10 in.; in another it is less than 9 in.; in another it is less than 8 in.; in another it is less than 7 in.; in another it is less than 6 in.; in another it is less than 5 in.; in another it is less than 4 in.; in another it is less than 3 in.; in another it is less than 2 in.; in another it is less than 1 in.; and in another it less than 0.5 in. In other embodiments, distance D1 may be in the range of 0.25 in. to 10 in., or in the range of 0.25 in. to 8 in., or in the range of 0.25 in. to 6 in., or in the range of 0.25 to 4 in., or in the range of 0.25 to 3 in., or in the range of 0.25 in. to 2 in., or in the range of 0.25 in. to 1 in. Where the pre-cooked food is placed in one or more trays, as shown in FIG. 19, each tray T is supported by supports 247 in a respective compartment 207 at an elevation where the bottom of the tray is spaced above the floor of the compartment a suitable distance D2. Distance D2 may be in the range of 0-12 in., and more preferably 0.5-1.0 in. Alternatively, the food may be placed on the floor of the compartment.

The heat sources 235 in the cabinet 203 are controlled by a suitable control mechanism 251, similar to the control mechanism 140 described above, which can be used to operate each heat source 235 independently of the other heat sources to deliver varying amounts of radiant energy to the food in a respective compartment. In this manner, the amount of radiant energy delivered to the food in a compartment 207 can be closely controlled to maintain the food at an appropriate holding temperature for that particular food, as described above. Also, because the amount of radiant heat delivered to the food is varied as a function of time, the heat source 235 in each compartment 207 can be placed much closer to the food (e.g., distance D1 in FIG. 19, discussed above), which has the desirable advantage of reducing the size of the cabinet 203. This is in contrast to conventional IR holding units where the energy delivered by the heat source is not variable. Rather, the heat source is energized to deliver full power all of the time. As a result, the heat source must be positioned relatively far from the food (e.g., 12 in. or more).

In one embodiment, the control mechanism 251 is programmed for different types of food, so that after food has been placed in a particular compartment 207, an operator simply selects that type of food from a suitable menu on a display (not shown) on the cabinet. The control mechanism then automatically selects the appropriate heating protocol for the food selected, including one or more of the following: the ideal holding temperature for the food selected; the duration of holding time ("holding duration"); and the manner in which the heat source in each compartment is to be varied to maintain the food at the desired holding temperature (e.g., percent on time during each duty cycle, if duty cycles are used). For convenience, the control 251 also includes a timer which times out the holding duration, and a display 255 which shows the time remaining until the end of holding duration. The control mechanism 251 may also include a visual and/or audible alarm for alerting an operator at a predetermined time before the end of the holding duration, so that steps can be taken to start cooking a fresh batch or batches of additional food. (At the end of a holding duration, any food remaining in the compartments 207 is typically disposed of and replaced by freshly cooked food.)

Figure 22A:
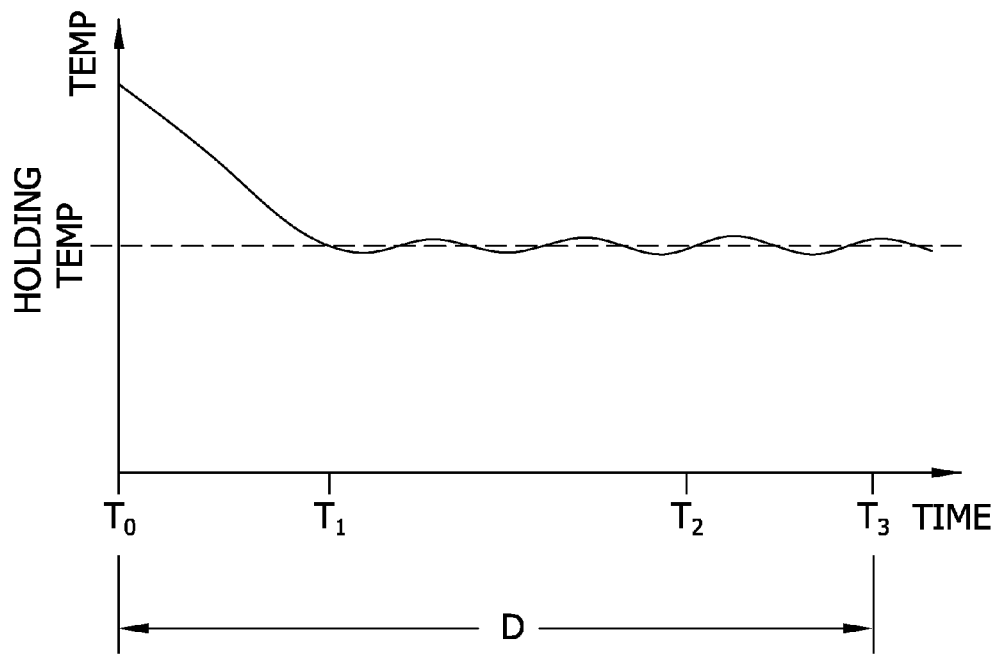
FIG. 22A is a graph of a time v. holding temperature curve during an embodiment of a holding duration.
Figure 22B:
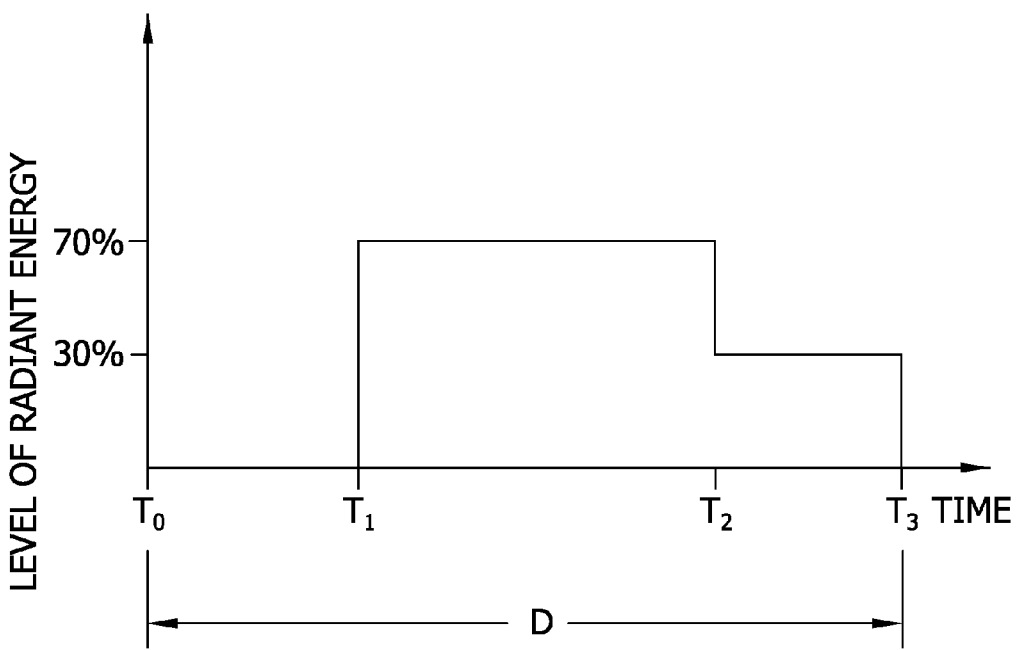
FIG. 22B is a graph of time v. radiant energy curve during the embodiment of FIG. 22A.

As noted previously, an important aspect of this invention is the ability of the control mechanism 251 to vary the amount of radiant heat delivered by the heat source in each compartment 207 to the pre-cooked food in the compartment. In general, or at least typically, it is desirable that pre-cooked food introduced into the compartment be allowed to cool down as quickly as possible to the desired holding temperature, and that the food be held relatively constant at the desired holding temperature using a minimum of power to the heat source 235. The graphs in FIGS. 22A and 22B illustrate this concept. FIG. 22A graphs time v. temperature in one compartment 207. Pre-cooked food introduced into the compartment at time $T_0$ cools down to the desired holding temperature at time $T_1$. Thereafter, the food is substantially maintained at the holding temperature for the remainder of the holding duration D. FIG. 22B is a graph of time v. the radiant energy delivered by the heat source 235 to the food. In the particular embodiment shown in this graph, the heat source is operated at a first relatively low level (where the heater is either off or delivering radiant heat at low level of energy or power, e.g., 10% of maximum) during a first phase or time interval P1 from time $T_0$ to time $T_1$, so that little or no radiant energy is delivered to the food. As a result, the temperature of the food declines relatively rapidly toward ambient temperature. When the temperature of the food approaches (or reaches) the desired holding temperature, the control mechanism 251 causes the heat source 235 in the compartment 207 to deliver radiant heat at a second higher level (e.g., 70% of maximum) to stop the decline in temperature of the food and hold it at about the desired holding temperature during a second phase or time interval P2 from time $T_1$ to time $T_2$. After the temperature of the food has equilibrated at the desired holding temperature, which will vary depending on the particular type of food, the control mechanism 251 causes the heat source 235 to reduce the amount of radiant heat delivered to the food to a third level (e.g., 30% maximum) sufficient to maintain the food at the desired holding temperature during a third phase or time interval P3 from time T2 until the end of the holding period at time T3.

It will be understood that the graphs shown in FIGS. 22A and 22B can vary, and that the number of phases (time intervals) P1, P2, P3 discussed above can vary without departing from the scope of this invention. In general, the term "phase" as used herein to describe the operation of a heat source is an interval of time over which the duty (on-off) cycle of the heat source remains the same.

Figure 23:
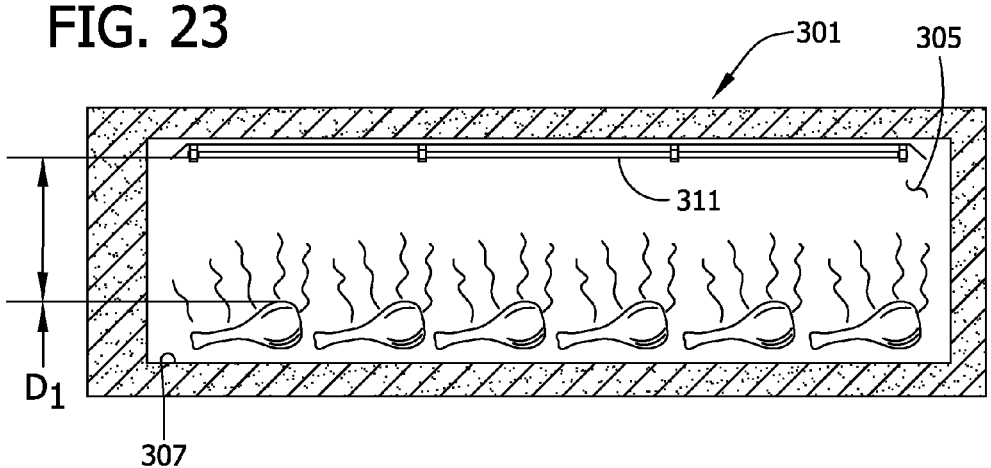
FIG. 23 is a schematic view of a holding oven of another embodiment.

FIG. 23 shows another embodiment of a holding oven of this invention, generally designated 301. The oven is similar to those described above except that the cabinet of the unit has only one compartment. In this embodiment, food is not placed in a tray, but rather on the bottom wall 307 or other supporting surface in the compartment, and the heat source 311 is closely spaced above the food to heat the food and maintain it at the desired holding temperature. The spacing D1 between the food and the IR heat source is relatively small (as discussed above) to reduce the overall height dimension of the oven 301. The heat source 311 is controlled by a control mechanism 140, 251 of the type described above.

Figure 24:
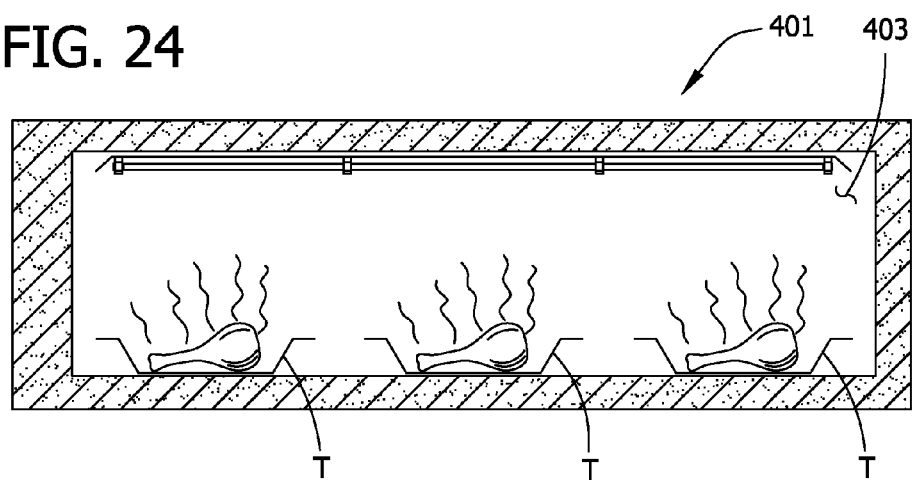
FIG. 24 is a schematic view of a holding oven of still another embodiment.

FIG. 24 shows a holding oven, generally designated 401, which is similar to the oven shown in FIG. 23. In this embodiment, the single compartment 403 of the oven is sized to hold multiple trays T. All other aspects of the oven, including the heat source and control mechanism, are the same.

Figure 25:
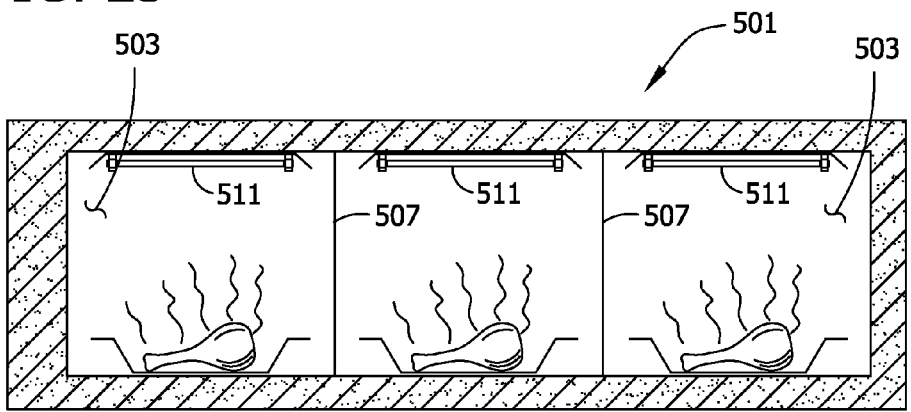
FIG. 25 is a schematic view of a holding oven of yet another embodiment.

FIG. 25 shows a holding oven, generally designated 501, which is similar to the oven shown in FIG. 24 except that the oven is divided into three compartments 503, each of which is capable of receiving food placed on the bottom wall or other supporting surface in the compartment. Partitions 507 between the compartments prevent or at least inhibit the transfer of food flavors between adjacent compartments. Each compartment 503 has its own heat source 511 which is spaced relatively closely to the bottom wall of the compartment to maintain the distance between the food and the heat source within the ranges (e.g., distance D1) described above. The heat sources 511 are controlled by a control mechanism similar to the control mechanism 140, 251 described above.

Optionally, the different embodiments of the warming apparatus described above may incorporate an energy compensation feature. This feature is intended to compensate for the transfer of heat from a first compartment to a second compartment adjacent or "next door" to the first compartment. In general, it is preferred that the compartments be thermally isolated with respect to one another, meaning that at least some insulation is provided between the compartments to reduce the transfer of heat from one to the other. However, as a practical matter, it may not be economical to prevent the transfer of significant amounts of heat. The energy compensation feature of this invention is intended to compensate for any such heat transfer.

This energy compensation feature has particular application to apparatus having heat sources which cycle on and off (or between higher and lower levels of energy output) according to a programmed, time-based sequence, as described above. Unlike a closed-loop system where operation of the heat sources is controlled by feedback from temperature sensors in the compartments being heated, the heat sources operating in a duty-cycle system of the type described above operate without such feedback. Accordingly, without an energy compensation feature to account for any transfer of heat from one compartment to another, e.g., from a lower compartment to an upper compartment immediately above it, the performance of the oven may be adversely affected. For example, the food product temperature in the upper compartment may exceed specifications due to the transfer of heat from the lower compartment.

As described above, the operation of each source of an apparatus of this invention may be programmed to operate in successive time-based cycles to heat food for a predetermined duration of holding time. Each of these cycles has a time-base G (see, for example, FIGS. 13 and 15) comprising a first ("ON") time interval E during which a respective heat source is activated to deliver heat at a first level. The duration of this first interval will vary from 100% of the time-base G, as when the heat source is operating at 100% power, i.e., at a duty cycle of 100%, to something less than 100%. When the heat source is operating at less than 100% power, which is typical during at least certain segments or phases of the overall duration D of holding time, the time-base G comprises a second ("OFF") time interval F during which the heat source is either not activated or activated to deliver heat at a second level less than the first level during interval E. In this regard, complete deactivation of the heat source during interval F may be more practical. However, in some situations, it may be desirable to maintain the heat source at some reduced or minimum level of power during the "OFF" interval F. In the case of an electric heat source, this can be accomplished by using a transformer or switched resistor to change the output from the aforesaid first (higher) power level to the aforesaid second (lower) power level during interval F. If the heat source is a gas combustion heat source, the power level can be changed by using pulse modulation of the gas or air supply, or by using variable speed blowers for primary air adjustment within certain limits.

Regardless of the heat source used, the time-base G of the on-off cycle can be programmed to any selected value, 60, 90 or 120 seconds, depending on various factors, including the type of heat source used. In this regard, different heat sources have different reaction or heat-up times. Typically, a longer reaction or heat-up time requires a longer time-base (G). The time-base of the on-off cycle for a heat source typically represents only a relatively small fraction of the overall duration D of holding time.

It will be apparent from the foregoing that the amount of heat delivered by a heat source to the food in a particular compartment during a duration D of holding time can be established by selecting an appropriate duty cycle of the heat source (i.e., an appropriate ratio or percentage of on-off time), and that the amount of heat delivered can be varied by changing the duty cycle during different phases of the holding duration D, as illustrated in FIG. 22B and discussed above. For example, the duty cycle may be 0% during a first time segment or phase (allowing pre-cooked food to cool down), 75% during a second time segment or phase (to slow the rate of food cool-down), and 50% during a third time segment or phase (to maintain the food at a desired holding temperature). In general, the appropriate change(s) in the duty cycle of a heat source during duration D can be programmed in accordance with a cooking/warming "recipe" selected for a particular food product.

The energy compensation feature of this invention can be used in the food warming apparatus 201 described above. In one embodiment, the heat sources 235 are infra-red (IR) heat sources located above the food for delivering radiant heat to the food below, but other types of heat sources can be used. In any event, to compensate for the transfer of heat between first and second adjacent (neighboring) compartments, and particularly from a lower compartment to an upper compartment immediately above it, the control mechanism is programmed to vary the amount of heat delivered by the heat source in the upper compartment as a function of the amount of heat delivered by the heat source in the lower compartment. In one embodiment, the control system is programmed to decrease the amount of heat delivered by the heat source in the upper compartment as the amount of heat delivered by the heat source in the lower compartment increases, thus compensating for the increased heat transfer. The specific amount of decrease can be determined empirically or otherwise.

Table 1 below shows an exemplary algorithm for varying the amount of heat delivered by the heat source in the upper compartment as a function of the amount of heat delivered by the heat source in the lower compartment.

TABLE 1

| Percent Power - Lower Compartment | Power Decrease (in % points) - Upper Compartment |
|---|---|
| 10 | 5 |
| 20 | 8 |
| 30 | 11 |
| 40 | 15 |
| 50 | 19 |
| 60 | 22 |
| 70 | 24 |
| 80 | 26 |
| 90 | 28 |
| 100 | 30 |

As used in Table 1, the term "Percent Power—Lower Compartment" means the percentage of full power delivered by the heat source in the lower compartment. In the context of duty-cycle operation, "100% full power" means the heat source has a duty cycle of 100%, i.e., the heat source remains activated at its highest power level during the entire duration of the time-base (G), and "10% full power" means a the heat source has a duty cycle of 10%, i.e., the heat source remains at full power for 10% of the time-base and at a lower power or de-activated entirely for the remaining 90% of the time base. As used in Table 1, the term "Percent Power Decrease—Upper Compartment" means the number of percentage points by which the power delivered by the heat source in the upper compartment is reduced to compensate for heat transferred from the lower compartment. Taking an example from Table 1, if the heat source in the lower compartment is operating at 50% full power (a duty cycle of 50%), the amount of heat delivered by the heat source in the upper compartment is reduced by 19 percentage points from its normal programmed (recipe) amount. This reduction is achieved by decreasing the duty cycle of the heat source in the upper compartment by 19 percentage points from its normal programmed amount. So for, example, if the heat source in the upper compartment would normally be operating at 50% power (a 50% duty cycle), the heat source would be operated such that its heat output is reduced by 19 percentage points to 31% power (a 31% duty cycle), thus compensating for heat transferred to the upper compartment from the heater in the lower compartment.

The amount of energy compensation for any given system will depend on various factors, including the power levels at which the heat sources are operating in adjacent (e.g., upper and lower) compartments, the amount of heat transfer between compartments at given power levels, and the type of food products involved. Thus, if the heat source in a lower compartment is not operating, there will be no need for adjusting the programmed (recipe) energy level of the heat source operating in the upper compartment. On the other hand, if the heat source in the lower compartment is operating, the power level of the heat source in the upper compartment above it may or may not have to be adjusted, depending on the level of heat transfer and effect on the food in that compartment. The amount of compensation may be derived by testing the temperature differential between the compartments at different energy levels, i.e., at different levels of power for the heat sources in the compartments, and by monitoring the effects on particular types of food. In general, however, the compensation should be sufficient to substantially cancel the effects of heat transfer that naturally occurs between compartments as a result of conduction and/or convection.

Based on information derived empirically, or in other ways (e.g., using heat transfer models and mathematical calculations), a suitable algorithm such as the one in Table 1 can be developed to achieve the desired compensation for one or more food products. This algorithm is programmed into the control system to control the heat sources of the apparatus to achieve the appropriate energy compensation. Further, more than one algorithm may be used. For example, one algorithm may be developed and used to control the operation of the heat source in an upper compartment adapted for holding a certain type of food, and a different algorithm may developed and used to control the operation of the heat source in an upper compartment adapted for holding a different type of food. There may even be some situations where it is desirable to compensate for heat transfer between compartments which are located side-by-side (rather than one above the other). In these situations, one or more different algorithms may be required.

Figure 26:
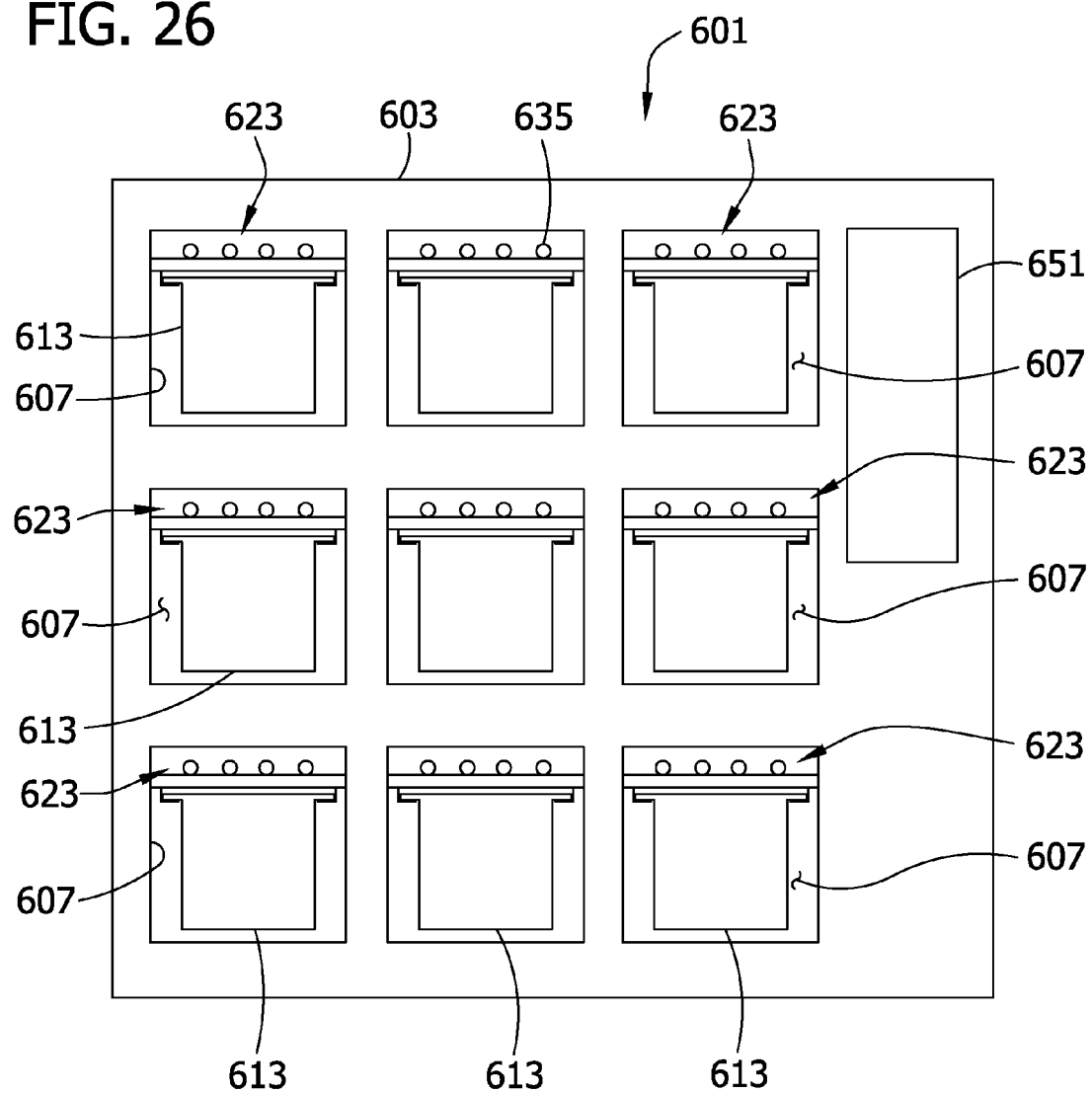
FIG. 26 is a front view of one embodiment of cooling apparatus of the present invention incorporating an energy compensation feature.
Figure 27:
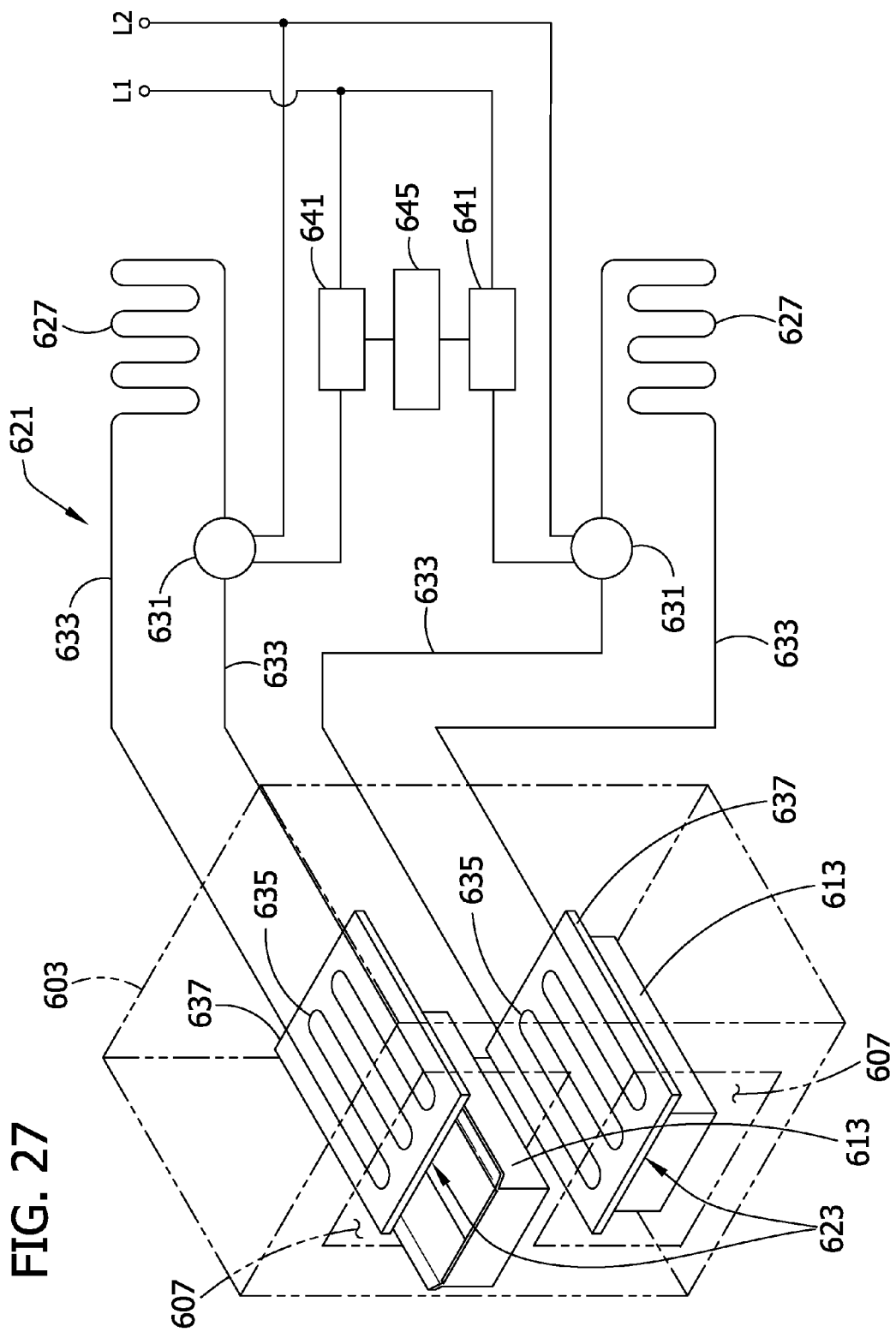
FIG. 27 is a schematic view showing various cooling and control components of the cooling apparatus of FIG. 26.

The energy-compensation feature is described above in the context of food warming apparatus. However, it will be understood that this feature may be used with any heating or cooling apparatus having multiple refrigerated and/or heated compartments where the transfer of heat may affect the performance of the appliance. For example, FIGS. 26 and 27 illustrate an exemplary refrigerated food holding apparatus, generally designated 601, comprising a cabinet 603 having a plurality of compartments 607 for holding pans 613. The number of compartments can vary from two to three or more. The apparatus 601 includes a refrigeration system, generally designated 621. In one embodiment, the refrigeration system 621 is a vapor-compression system comprising, for each compartment 607, an evaporator generally designated 623 for cooling the compartment and the food therein, a condenser 627, a compressor 631 and fluid lines 633 connecting these various components in a manner which will be understood by a person skilled in this field. The evaporator 623 associated with each compartment 607 may comprise one or more heat transfer lines 635 on a cooling plate 637 mounted on or adjacent one or more walls of the compartment.

The operation of the compressors 631 is controlled by an electrical circuit containing lines L1, L2 and relays 641 under the control of a control unit 645. A suitable control panel 651 is provided on the cabinet 601 for inputting information to the control unit. In one embodiment, the control unit 645 is programmed to operate the compressors 631 in time-based cycles to cool the individual compartments 607 to the desired temperatures independent of one another. These time-based cycles are essentially the same as described above in regard to the warming apparatus, each having a time base G. The ratio of ON-OFF time of each compressor 631 can be adjusted as needed or desired to vary the temperature in the compartments independently of one another. The control unit 645 is programmed with software having the compensation feature discussed above. The system works the same way as described above regarding the warming apparatus except that the heat transfer operates in reverse, since the apparatus 601 is cooling, not heating. Thus, the amount of heat transferred from one compartment 607 (e.g., a lower compartment) and the food therein is adjusted to compensate for the extraction of heat from an adjacent (e.g., upper) compartment and food therein. This compensation prevents overcooling of the latter (e.g., lower) compartment to avoid degradation of food product sensitive to overcooling, such as lettuce.

It will be observed from the foregoing that apparatus having the energy compensation feature of this invention comprises the following elements:

(1) a first compartment (e.g., an upper compartment 207, 607);

(2) a first heat transfer device (a heat source, such as source 235, or a cooling device 623) operable in time-based cycles for heating or cooling the first compartment;

(3) a second compartment (e.g., a lower compartment 207, 607) adjacent the first compartment;

(4) a second heat transfer device (a heat source, such as source 235, or a cooling device 623) operable in time-based cycles for heating or cooling the second compartment; and (5) a control system (e.g., system 140, 251, 645) for varying the amount of heat transferred by the first heat transfer device as a function of the amount of heat transferred by the second heat transfer device.

In some embodiments, the control system (e.g., 140, 251, 645) is programmed to operate the first heat transfer device (a heat source, such as source 235, or a cooling device 623) in successive time-based cycles, each of which comprises a timed duration (e.g., G in FIGS. 13 and 15) comprising a first time interval (e.g., E) during which the first heat transfer device is activated to heat or cool at a first level. At least some of these cycles further comprise a second time interval (e.g., F in FIGS. 13 and 15) during which the first heat transfer device is either not activated or activated to heat or cool at a second level less than the first level.

Similarly, the energy-compensation feature of this invention can be utilized in apparatus for heating or cooling according to a method comprising the following steps:

(1) operating a first heat transfer device (a heat source, such as source 235, or a cooling device 623) in successive time-based cycles to heat or cool a first compartment (e.g., an upper compartment 207, 607) of the apparatus;

(2) operating a second heat transfer device (a heat source, such as source 235, or a cooling device 623) in successive time-based cycles to heat or cool a second compartment of the apparatus (e.g., a lower compartment 207, 607) adjacent the first compartment; and (3) varying the amount of heat transferred by the first heat transfer device as a function of the amount of heat transferred by the second heat transfer device.

The use of the energy compensation feature described above avoids overheating (or overcooling) of food products in the compartments, particularly upper compartments located above lower compartments. More uniform heating (or cooling) of the food products, and thus improved food quality, is also achieved.

In another aspect of this invention, the different embodiments of the warming apparatus described above may optionally incorporate an "energy-limit" feature for preventing the overheating of food product, trays and heat-sensitive components of the apparatus. This feature is particularly useful for apparatus comprising one or more heat sources which operate in successive time-based cycles over a predetermined duration of holding time D according to a predetermined program, as described above. In general, the energy-limit feature is adapted to override the predetermined program (typically input by an operator) in the event the amount of energy delivered to the food over a segment of time exceeds a predetermined energy limit.

Figure 28:
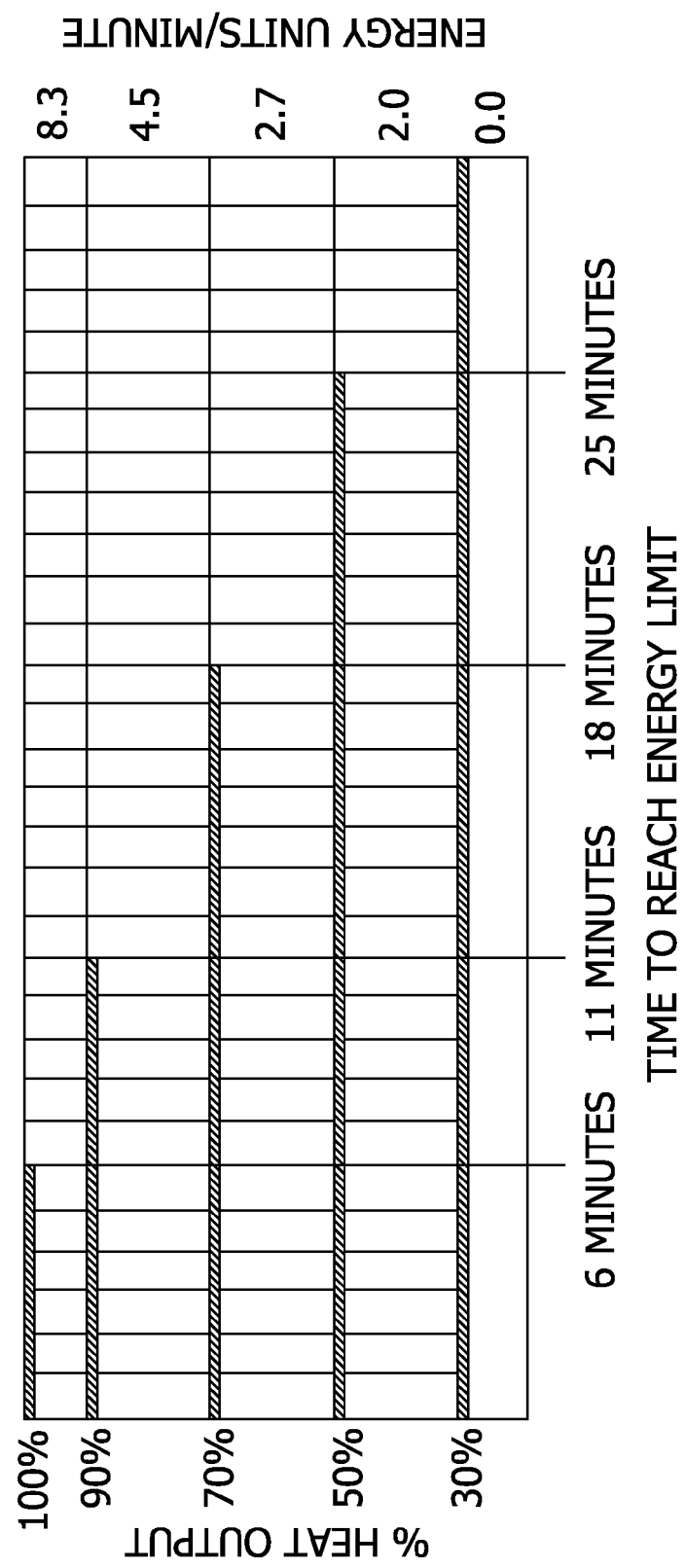
FIG. 28 is a chart illustrating an exemplary method for determining the heat output of a heat source.

To implement the energy limit feature, tests are conducted on a food product to determine an energy limit which, if exceeded, will cause overheating of the food, food tray, or other components of the apparatus. (As used herein, the term "overheating" means heating to a point which would be considered to be unsafe or otherwise undesirable.) The results of these tests can be used to develop a suitable energy-limit algorithm for preventing such overheating. For example, the chart of FIG. 28 shows the results of a test in which a heat source was operated at different heat outputs (100%, 90%, 70%, 50% and 30%; corresponding to duty cycles of 100%, 90%, 70%, 50% and 30%, respectively) until the food being heated in a compartment of the apparatus started smoldering, indicating overheating. As illustrated, when the heat source operated at 100% heat output or continuous full power (a 100% duty cycle) the food started smoldering at about 6 minutes; at 90% heat output (a 90% duty cycle) the food started smoldering at about 11 minutes; at 70% heat output (a 70% duty cycle) the food started smoldering at about 18 minutes; and at 50% heat output (a 50% duty cycle) the food started smoldering at about 25 minutes. At a heat output of 30% (a 30% duty cycle), the food did not smolder during the entire duration of the test (30 minutes).

If an arbitrary number of energy units (e.g., 50 units or points) is selected to represent the total amount of energy to be delivered to the food over a period of time to prevent overheating (e.g., smoldering in this example), the energy units accumulate at the following rate for the following duty cycles: 8.3 units/minute at 100% duty cycle (50 energy units divided by 6 minutes); 4.5 pts/minute at 90% duty cycle (50 energy units divided by 11 minutes); 2.7 pts/minute at 70% duty cycle (50 energy units divided by 18 minutes); and 2.0 pts/minute at 50% duty cycle (50 energy units divided by 25 minutes). No energy units are assigned to a 30% duty cycle, since the heat source can be operated at that power level for an extended period of time without causing overheating. By periodically (e.g., every sixty seconds) determining the number of energy units which accumulate during a preceding 30-minute time segment of the duration D of holding time, and by automatically reducing the heat output (i.e., power level or duty cycle) of the heat source if the total amount of energy delivered during that time segment exceeds the threshold level (e.g., 50 energy units), overheating can be avoided.

In a preferred embodiment, the energy limit function uses a "rolling" time segment (window of time) to determine the total accumulated energy. That is, for each new time period (e.g., every minute), the total number of energy units accumulated during the preceding predetermined number of consecutive time periods (e.g., the immediately preceding thirty (30) one-minute time periods) is determined and any appropriate adjustments to the heat source are made. During the next time period, the process is repeated and another determination is made for the preceding same number of consecutive time periods (e.g., the immediately preceding thirty (30) one-minute time periods). This has the effect of dropping off or removing the energy units corresponding to the oldest time period used in the immediately preceding determination and adding the energy units corresponding to the newest time period. Thus, the time segment or window of time for which the total number of accumulated energy points is determined "rolls" continuously forward in time.

FIG. 29 (which is broken up into parts 29A-29H for convenience) is a chart illustrating operation of a warming apparatus of this invention having a control system which is programmed to incorporate the energy-limit feature described above using a "rolling" time segment or window of time. In this example, the control system has been programmed to follow a cooking/warming "recipe" in which one or more of the heat sources operates at a 90% duty cycle for a 90-minute duration of holding time. As described above, an operator can input this information directly, or the operator can simply select a particular type of food, in which case the control system will automatically run a program which has been pre-selected for that particular food. (In either case, the heating program or "recipe" followed by the control system is predetermined.)

The chart of FIG. 29 is divided into multiple time periods of equal duration. For convenience, each time period is one minute (sixty seconds) long, for a total of ninety time periods designated 1-90, but other time period durations can be used. During the course of the ninety minutes of holding time, the control system controls the operation of the heat source(s) according to the predetermined heating program ("recipe"). Every time period (e.g., every minute), the control system also calculates the total number of energy units accumulated during the preceding thirty (30) time periods and, if necessary, adjusts the heat output of the heat source(s) to avoid overheating, as determined by the energy limit feature.

The chart of FIG. 29 contains the following information for time periods 1-90:
  "Desired Duty Cycle"—the programmed ("recipe") duty cycle for the relevant time period;
  "Actual Duty Cycle"—the actual duty cycle at which the heat source operates during the relevant time period;
  "% Point Change"—the percentage-point reduction of the duty cycle, effected by the energy-limit feature, during the relevant time period to avoid overheating;
  "Energy Units Earned/Period"—the number of energy units earned during the time period; and
  "30-Period Total"—the total number of energy units accumulated during the immediately preceding 30 periods of operation.

As will be observed from the chart in FIG. 29, the heat source(s) operates according to its programmed "recipe" at 90% power (a 90% duty cycle) for time periods 1-11. For each of these time periods, the control system determines the total number of energy units accumulated during the preceding thirty (30) one-minute time periods, or if the number of preceding periods is less than thirty, during all such preceding periods. As shown in FIG. 29A, the energy units accumulate during time periods 1-11 and reach a total of 49.5 energy units at time period 11 (11 minutes times 4.5 units/minute). At time period 12, the total number of accumulated energy units is determined to be 54, a number which exceeds the energy limit of 50 units. As a result, in accordance with the energy-limit feature used in this example, the control system reduces the duty cycle from 90% to 30%, or a reduction of 60 percentage points, to decrease the heat output of the heat source(s) to avoid overheating.

After time period 12, the heat source continues to operate at a reduced level (e.g., at a 30% duty cycle) until the total number of energy units accumulated during the "rolling" window of thirty (30) one-minute time periods drops down to a number at or below the predetermined energy limit (50 energy units in this case). Thus, in the example of FIG. 29, the heat source continues to operate at reduced power through time period 31. At this time period, the control system determines that the total number of energy units accumulated during the preceding 30 consecutive one-minute time periods (the "rolling window of time") is 49.5. Since that number is below the energy limit of 50 units, the control system resumes operation of the heat source(s) at 90% power, according to the predetermined "recipe" program. That operation continues through time period 43, when it is determined that the total number of energy points accumulated during the preceding consecutive thirty one-minute time periods (i.e., the "rolling window of time") is 54, again exceeding the energy limit of 50 units. As a result, the control system again reduces the power of the heat source(s) to 30% (see FIG. 29D). This cycling continues, as shown in FIG. 27, with 90% power resuming at time period 63, dropping to 30% at time period 75 (FIG. 29G), and continuing at the lower 30% level through time period 90 (FIG. 29H).

Figure 30:
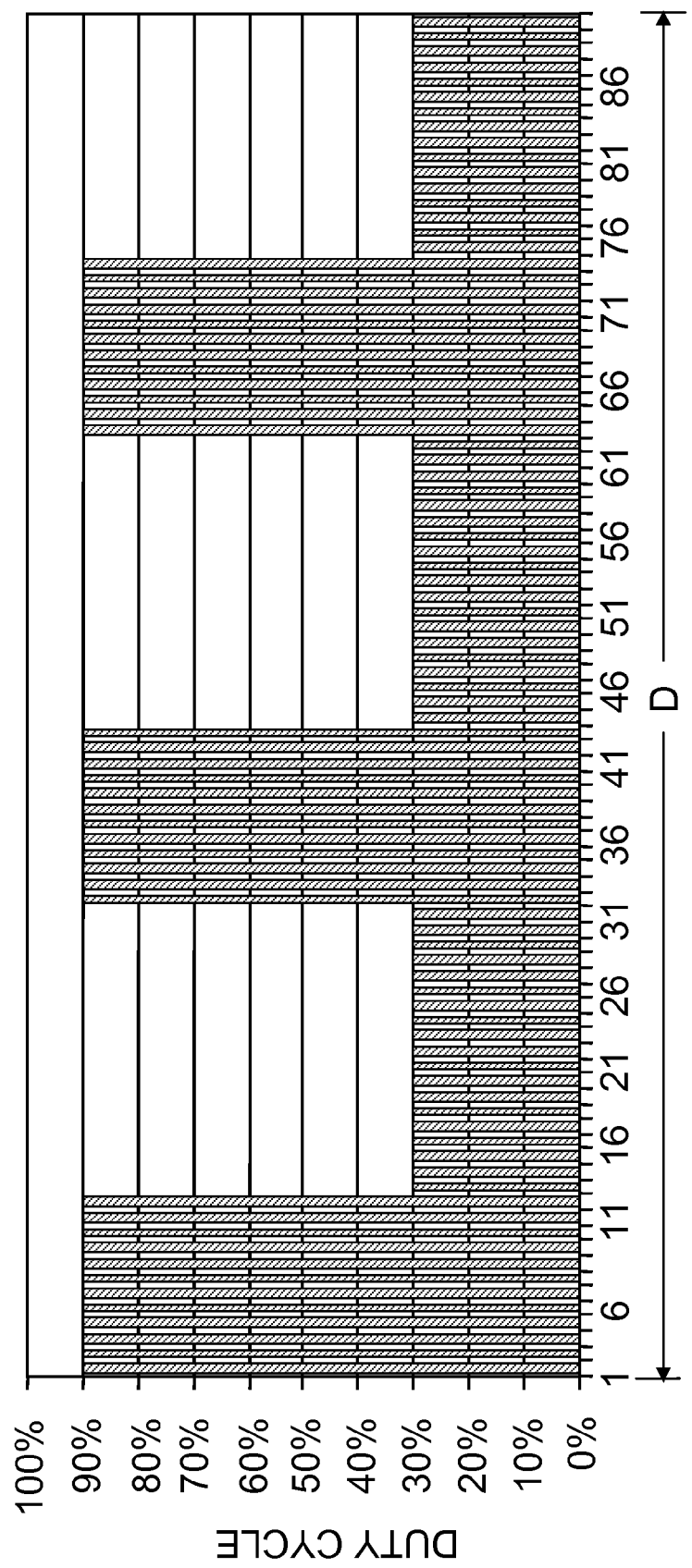
FIG. 30 is a chart illustrating the energy-limit feature of FIGS. 29-29H.

FIG. 30 is a chart similar to FIG. 29 but showing the variation in the duty cycle of the heat source(s) over the 90-period duration D of holding time of the test described in the above example.

By using the energy-limit feature in this manner, overheating and the potential negative consequences thereof are prevented. Typically, the energy-limit feature will not be triggered during normal operation where the operator properly programs the warming apparatus. However, in the event of a programming mistake or other situation where the amount of energy delivered to the food exceeds a predetermined limit, the energy-limit feature will prevent overheating.

It will be understood that the energy-limit feature described above is exemplary only. One or more (or any combination) of the following characteristics of this feature can be changed depending on the particular apparatus, heat source(s), and food involved: the length of the individual time periods (e.g., one minute in the above example); the length of the rolling time segment (window of time) over which the accumulation of energy is tracked to see if an energy limit has been reached (e.g., 30 minutes in the above example); the number of energy units established as the threshold "limit" for triggering a reduction in heater output (e.g., 50 energy units in the above example); and the percent-point reduction of the duty cycle (60 percentage points in the above example).

In general, apparatus which includes the energy-limit feature described above comprises the following elements:
  (1) at least one compartment into which food is adapted to be placed;
  (2) a heat source for delivering heat to the food in the compartment;
  (3) a control system for operating the heat source in successive time-based cycles (e.g., cycle G in FIG. 13) over a duration of holding time (e.g., D in FIG. 13) according to a predetermined program; and wherein
  (4) the control system comprises an algorithm adapted to override the predetermined program and to reduce the heat output of the heat source in the event the amount of energy delivered by the heat source during a preceding segment of the duration of holding time reaches or exceeds a predetermined energy limit.

In the example given above, each of the time-based cycles (G) comprises a first interval (E) during which the heat source is activated to deliver heat at a first level, and at least some of the time-based cycles comprise a second interval (F) during which the heat source is either not activated or activated at a second level less than the first level. The heat output of the heat source(s) is reduced by decreasing the ratio of the first time interval (E) to the sum of the first and second time intervals (E+F), i.e., the duty cycle of the heat source. Further, the control system operates according to the algorithm to maintain the heat source at a reduced output until a time is reached where the amount of energy delivered by the heat source over a preceding predetermined number of consecutive time periods (e.g., 30 in the example) drops to or below the energy limit, at which time the heat source is adapted to resume operation according to the predetermined ("recipe") program.

Similarly, the "energy-limit" feature of this invention can be utilized according to a method comprising the following steps:
  (1) placing food into a compartment of the apparatus;
  (2) operating at least one heat source of the apparatus in successive time-based cycles over a holding period according to a predetermined program to deliver heat to the food in the compartment; and (3) overriding the predetermined program and reducing the heat output of the heat source in the event the amount of energy delivered by the heat source during a preceding segment of said duration of holding time reaches or exceeds a predetermined energy limit.

The energy-limit algorithm used in any given situation will vary depending on different factors, including the type of food being heated, the quantity of food, the type of heat source(s), the time it takes for the heat source to activate, etc. Thus, in many situations, it will be appropriate to program more than one energy-limit algorithm into the control system. For example, a first algorithm may be programmed to take effect when a heating program for a first particular food product is activated, and a second different algorithm may be programmed to take effect when a heating program for a second different food product is activated.

As previously discussed, the preferred type of heat source is an infrared heater capable of delivering infrared heat to the food below. However, the energy compensation and energy limit features described above can be used with other types of heat sources.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for heating food, said apparatus comprising:
a first compartment into which food is adapted to be placed;
a first heat source in the first compartment for delivering heat to food in the first compartment;
a second compartment adjacent the first compartment into which food is adapted to be placed;
a second heat source in the second compartment for delivering heat to food in the second compartment; and
a control system for controlling the operation of said first and second heat sources, said control system being programmed to operate the first heat source to vary the amount of heat delivered in the first compartment by the first heat source as a function of the amount of heat delivered in the second compartment by the second heat source.

2. Apparatus as set forth in claim 1 wherein said first compartment is located above the second compartment.

3. Apparatus as set forth in claim 2 wherein said control system is programmed to operate the first heat source to decrease the amount of heat delivered by said first heat source as the amount of heat delivered by said second heat source increases.

4. Apparatus as set forth in claim 1 wherein each heat source is located for radiating infrared heat down on food in a respective compartment.

5. Apparatus as set forth in claim 1 wherein said control system is programmed to operate said first heat source in successive time-based cycles, each of said time-based cycles comprising a first time interval during which the first heat source is activated to deliver heat at a first level.

6. Apparatus as set forth in claim 5 wherein said control system is programmed to vary a characteristic of successive time-based cycles of said first heat source as a function of the amount of radiant heat delivered by the second heat source.

7. Apparatus as set forth in claim 6 wherein at least some of said time-based cycles further comprise a second time interval during which the first heat source is either not activated or activated to deliver heat at a second level less than said first level.

8. Apparatus as set forth in claim 7 wherein said characteristic is a ratio of the first time interval to the sum of said first and second time intervals.

9. Apparatus as set forth in claim 8 wherein said control system is programmed to operate said second heat source in successive time-based cycles, each of said time-based cycles comprising a first time interval during which the second heat source is activated to deliver heat at a first level, and at least some of said time-based cycles comprising a second time interval during which the second heat source is either not activated or activated to deliver heat at a second level less than said first level.

10. Apparatus as set forth in claim 1 wherein said first and second heat sources are operable independent of one another so that the food in said first and second compartments can be heated to different selected temperatures.

11. Apparatus as set forth in claim 1 wherein said control system comprises a first algorithm for determining the amount of heat delivered by the first heat source to a first food product in said first compartment as a function of the amount of heat delivered by the second heat source in said second compartment, and a second algorithm different from the first algorithm for determining the amount of heat delivered by the first heat source to a second food product, different from the first food product, in the first compartment as a function of the amount of heat delivered by the second heat source in said second compartment.

12. Apparatus as set forth in claim 1 further comprising a plurality of food-holding trays, each of said first and second compartments being sized for receiving only one food-holding tray of said plurality of food-holding trays.

13. A method of operating apparatus for heating food, comprising
placing food in a first compartment of said apparatus,
operating a first heat source of said apparatus to deliver heat to food in the first compartment,
placing food in a second compartment of said apparatus adjacent the first compartment,
operating a second heat source of said apparatus to deliver heat to food in the second compartment, and
varying the amount of heat delivered in the first compartment by the first heat source as a function of the amount of heat delivered in the second compartment by the second heat source.

14. A method as set forth in claim 13 further comprising decreasing the amount of heat delivered by the first heat source as the amount of heat delivered by the second heat source increases.

15. A method as set forth in claim 14 further comprising operating said first heat source in successive time-based cycles, each of said time-based cycles comprising a first time interval during which the heat source is activated to deliver heat at a first level.

16. A method as set forth in claim 15 further comprising varying a characteristic of said time-based cycles as a function of the amount of heat delivered by the second heat source.

17. A method as set forth in claim 16 wherein at least some of the time-based cycles further comprise a second time interval during which the heat source is either not activated or activated at a second level less than said first level.

18. A method as set forth in claim 17 wherein said characteristic is a ratio of the first time interval to the sum of said first and second time intervals.

19. A method as set forth in claim 18 further comprising operating said second heat source in successive time-based cycles, each of said time-based cycles comprising a first time interval during which the second heat source is activated to deliver heat at a first level, and at least some of said time-based cycles comprising a second time interval during which the second heat source is either not activated or activated to deliver heat at a second level less than said first level.

20. A method as set forth in claim 13 further comprising operating said first and second heat sources independent of one another to hold the food in said first and second compartments at different selected temperatures.

21. A method as set forth in claim 13 further comprising using a first algorithm to determine the amount of heat delivered by the first heat source to a first food product in said first compartment as a function of the amount of heat delivered by the second heat source, and using a second algorithm to determine the amount of heat delivered by the first heat source to a second food product, different from the first food product, in the first compartment as a function of the amount of radiant heat delivered by the second heat source.

22. A method as set forth in claim 13 wherein said food is pre-cooked food previously cooked in a cooking appliance, and wherein the heat delivered by said first and second heat sources is radiant heat delivered from above the food in respective compartments.

23. A method as set forth in claim 13 further comprising a plurality of food-holding trays, each of said first and second compartments being sized for receiving only one food-holding tray of said plurality of food-holding trays, said method further comprising placing only one tray containing pre-cooked food in the first compartment and only one tray containing pre-cooked food in the second compartment.

24. Heating or cooling apparatus comprising:
a first compartment;
a first heat transfer device operable in time-based cycles for heating or cooling the first compartment;
a second compartment adjacent the first compartment;
a second heat transfer device operable in time-based cycles for heating or cooling the second compartment; and
a control system for controlling the operation of said first and second heat transfer devices, said control system being programmed to operate the first heat transfer device to vary the amount of heat transferred to heat or cool the first compartment by the first heat transfer device as a function of the amount of heat transferred to heat or cool the second compartment by the second heat transfer device.

25. A method of operating apparatus for heating or cooling, said method comprising
operating a first heat transfer device in time-based cycles to heat or cool a first compartment of said apparatus,
operating a second heat transfer device in time-based cycles to heat or cool a second compartment of said apparatus, and
varying the amount of heat transferred by the first heat transfer device to heat or cool the first compartment as a function of the amount of heat transferred by the second heat transfer device to heat or cool the second compartment.

* * * * *